(12) United States Patent
Hochstetter et al.

(10) Patent No.: US 12,466,109 B2
(45) Date of Patent: ***Nov. 11, 2025

(54) METHOD FOR MANUFACTURING A FIBROUS MATERIAL PRE-IMPREGNATED WITH THERMOPLASTIC POLYMER IN A FLUIDISED BED

(71) Applicant: ARKEMA FRANCE, Colombes (FR)

(72) Inventors: Gilles Hochstetter, Colombes (FR); Thibaut Savart, Lacq (FR); Arthur Pierre Babeau, Lacq (FR); Axel Salinier, Lacq (FR)

(73) Assignee: ARKEMA FRANCE, Puteaux (FR)

( * ) Notice: Subject to any disclaimer, the term of this patent is extended or adjusted under 35 U.S.C. 154(b) by 123 days.

This patent is subject to a terminal disclaimer.

(21) Appl. No.: 17/415,073

(22) PCT Filed: Dec. 16, 2019

(86) PCT No.: PCT/EP2019/085282
§ 371 (c)(1),
(2) Date: Jun. 17, 2021

(87) PCT Pub. No.: WO2020/126996
PCT Pub. Date: Jun. 25, 2020

(65) Prior Publication Data
US 2022/0063137 A1 Mar. 3, 2022

(30) Foreign Application Priority Data
Dec. 18, 2018 (EP) .................................... 18306720

(51) Int. Cl.
*B29B 15/12* (2006.01)
*B29K 77/00* (2006.01)
*B29K 307/04* (2006.01)

(52) U.S. Cl.
CPC .......... *B29B 15/12* (2013.01); *B29K 2077/00* (2013.01); *B29K 2307/04* (2013.01)

(58) Field of Classification Search
None
See application file for complete search history.

(56) References Cited

U.S. PATENT DOCUMENTS 11,413,832 B2 * 8/2022 Hochstetter ............. B29C 70/20
2019/0084252 A1 * 3/2019 Hochstetter ........... B29B 15/122
2020/0139587 A1   5/2020 Pellet et al.

FOREIGN PATENT DOCUMENTS

EP      0300321 A2 * 1/1989
EP      1505099 A2    2/2005
(Continued)

OTHER PUBLICATIONS

International Search Report (PCT/ISA/210) with translation and Written Opinion (PCT/ISA/237) mailed on Mar. 17, 2020, by the European Patent Office as the International Searching Authority for International Application No. PCT/EP2019/085282.

(Continued)

*Primary Examiner* — Alexander M Weddle
(74) *Attorney, Agent, or Firm* — Boone IP Law

(57) ABSTRACT

Method for manufacturing a material including a fibrous material with continuous fibres and a thermoplastic polymer matrix, the material being produced as a unidirectional band, the method including a step of pre-impregnation of a strand of the fibrous material by the matrix in powdered form, the pre-impregnation step being carried out in a fluidised bed including a grooved roller component, the strand being in contact with the surface of the roller component and including up to 0.1% by weight of sizing, the matrix rate being controlled by controlling the dwell time in the powder and (Continued)

by constantly controlling the tension of the strand when it is introduced into the fluidised bed.

26 Claims, 9 Drawing Sheets

(56) References Cited

FOREIGN PATENT DOCUMENTS

| | | | | |
|---|---|---|---|---|
| JP | 01-263005 A | 10/1989 | | |
| JP | 05-084737 A | 4/1993 | | |
| JP | 08-039560 A | 2/1996 | | |
| JP | 10-058448 A | 3/1998 | | |
| JP | 2017-533983 A | 11/2017 | | |
| JP | 2019-511593 A | 4/2019 | | |
| WO | WO-2015121583 A2 * | 8/2015 | ............... | B05D 1/18 |
| WO | 2018115737 A1 | 6/2018 | | |
| WO | 2018115738 A1 | 6/2018 | | |
| WO | WO-2018115736 A1 * | 6/2018 | ............... | B01J 8/382 |

OTHER PUBLICATIONS

Decision to grant received for European Patent Application No. 18306720, mailed on Jun. 23, 2022, 2 pages.

European Search Report and Search Opinion received for European Application No. 18306720, mailed on Jun. 19, 2019, 7 pages.

Intention to grant received for European Patent Application No. 18306720, mailed on Feb. 17, 2022, 6 pages.

Intention to grant received for European Patent Application No. 19817366, mailed on Jul. 17, 2023, 6 pages.

International Preliminary Report on Patentability received for PCT Patent Application No. PCT/EP19/085282, mailed on Jul. 1, 2021, 14 pages (7 pages of English Translation and 7 pages of Original Document).

Office Action received for Japanese Patent Application No. 2021-533850, mailed on Oct. 3, 2023, 10 pages (5 pages of English Translation and 5 pages of Original Document).

* cited by examiner

Front view

METHOD FOR MANUFACTURING A FIBROUS MATERIAL PRE-IMPREGNATED WITH THERMOPLASTIC POLYMER IN A FLUIDISED BED

The present invention relates to a method for manufacturing a fibrous material pre-impregnated with thermoplastic polymer in a fluidized bed.

More particularly, the invention relates to a method for manufacturing a pre-impregnated fibrous material comprising a step for pre-impregnation of a fibrous material which is not sized or sized very little so as to prepare an impregnated fibrous material, in particular to the core, with reduced and controlled porosity, in order to obtain bands of impregnated fibrous material with calibrated dimensions, usable directly to manufacture three-dimensional composite parts.

In the present description, "fibrous material" refers to an assembly of reinforcing fibers. Before it is pre-impregnated and shaped, it assumes the form of strands. After shaping and impregnation, particularly to the core of the fiber strands, it has the form of bands (or tapes), strips or layers. When the reinforcing fibers are continuous, their assembly constitutes a fabric or a nonwoven fabric (NCF). When the fibers are short, their assembly constitutes a felt or a fiber mat.

In the present description, the term "strip" is used to refer to strips of fibrous material having a width greater than or equal to 400 mm. The term "band" is used to refer to bands with a calibrated width smaller than or equal to 400 mm.

The term "strand" is used to refer to the fibrous material.

Such pre-impregnated fibrous materials are in particular suitable for producing light composite materials for manufacturing mechanical parts having a three-dimensional structure and having good mechanical and thermal properties. When the fibers are made from carbon or the resin is filled with suitable additives, these fibrous materials are capable of discharging electrostatic charges. They therefore have properties compatible with the manufacture of parts in particular in the mechanical, civilian or military aeronautics, nautical, automotive, oil and gas, in particular offshore, gas storage, energy, health and medical, army and weaponry, sports and recreation, and electronics fields.

However, the use of non-sized fibers is necessary for aeronautics and offshore uses. Indeed, in particular to manufacture structural parts and/or parts subject to extreme chemical/thermal environments, not only is it necessary for the polymer used to be able to withstand the stresses of the part, but it is also necessary for the fiber/matrix interface to be the best possible for better strength of the composite, both in mechanical stress transmission from the resin to the fibers and for chemical resistance, for example. The forces of these links between the matrix and the fibers are dictated by the impregnation quality of the material (limited porosity) and by the nature of the physicochemical or even mechanical links between the fiber and the polymer matrix.

With the aim of improving the physicochemical links between polymer and fibers, fiber manufacturers use sizings, the composition and level of which may vary. Now, generally being organic in nature (thermosetting or thermoplastic resin type) and very often formulated for the impregnation of the fibers by polymers with a low melting point or thermosetting polymers with a low Tg point, the sizings are often degraded by the impregnation methods, in particular during the pre-impregnation steps (melting process, passage in solvent solution, etc.) and/or during the steps for melting of the thermoplastic matrix, in particular when it has a high melting point (for a semi-crystalline or a high Tg (for an amorphous or a thermosetting). Furthermore, the chemical compatibility between the polymer of the matrix and the sizing is not always optimal; the resulting attachment force being able to be modified positively and negatively compared with that observed with a non-sized fiber.

This therefore raises a certain number of difficulties for the manufacture of tapes using a pre-impregnation method by a dry powder (or a mixture of dry powders), in particular in the case where each strand is pre-impregnated with powder separately from the others. In most cases, the strand(s) are guided by roller components (generally in the form of rollers) placed in a tank containing either the fluidized bed, or an aqueous dispersion.

Thus, international application WO2018115736 describes a method for pre-impregnating a fibrous material in a fluidized bed whereof the powder content depends on the dwell time in the fluidized bed and the tension on the strand(s) is controlled using a creel present before the tank comprising the fluidized bed.

Using at least one roller component (in particular a cylindrical roller of convex, concave or cylindrical shape) in the fluidized bed makes it possible to improve the pre-impregnation relative to the methods of the prior art and the fibrous material used can be sized or non-sized.

It is in no way specified in this application whether the rollers used are smooth or grooved (or notched).

The article by Gibson A. et al. (composites manufacturing, Vol. 3, No. 4 (1992)) describes a step for pre-impregnation in a fluidized bed of a fibrous material by a thermoplastic polymer comprising smooth rollers in the fluidized bed with control of the fiber content using a vibrating system placed at the tank outlet.

Nevertheless, when these rollers are smooth, the fact that the fibers are non-sized leads to very significant and above all very fluctuating spreading of the fiber strand, which directly affects the powder level carried by the fiber strand(s) and makes this level variable and uncontrolled.

Under conditions of low tension, whether or not the fibers are sized, controlling the dwell time no longer suffices to control the powder level and the excessively low tension causes twisting and/or winding of the strands.

However, in the case of non-sized fibers, excessive tension of the fibers causes damage to the latter in contact with the rollers and produces considerable fuzz, which pollutes the fluidized bed and disrupts the quality of the fluidization, and therefore the pre-impregnation quality of the tape.

It is therefore necessary to be able to control the powder level with non-sized fibers, continuously over time, without damaging them.

The invention therefore aims to address the shortcomings of the prior art.

The invention therefore relates to a method for manufacturing a pre-impregnated fibrous material comprising a fibrous material with continuous fibers and at least one thermoplastic polymer matrix, comprising a step of pre-impregnation, in particular homogeneous, of said fibrous material assuming the form of a strand or of several parallel strands by at least one thermoplastic polymer matrix in powdered form, said pre-impregnation step being done on a non-sized fibrous material in a tank comprising a fluidized bed provided with grooved cylindrical rollers.

The invention also relates to a unidirectional band of impregnated fibrous material, in particular a band wound on a spool, characterized in that it is obtained using a method as defined above.

The invention further relates to a use of the band as defined above in the manufacture of three-dimensional parts.

Said manufacture of said composite parts relates to the fields of transportation, in particular automotive, oil and gas, in particular offshore, gas storage, civil or military aeronautics, nautical, rail; renewable energies, in particular wind energy, tidal energy, energy storage devices, solar panels; thermal protection panels; sports and recreation, health and medical, security and electronics.

The invention also relates to a three-dimensional composite part, characterized in that it results from the use of at least one unidirectional band of impregnated fibrous material as defined above.

The invention relates to a method of manufacturing a pre-impregnated fibrous material comprising a fibrous material made of continuous fibers and at least one thermoplastic polymer matrix, characterized in that said pre-impregnated fibrous matrix is produced as a single unidirectional band or a plurality of unidirectional parallel bands and in that said method comprises a step of pre-impregnating, in particular homogeneously, said fibrous material while it is in the form of a strand (81a) or several parallel strands with said at least one thermoplastic polymer matrix in powdered form, said pre-impregnation step being done by the dry process in a tank (20) comprising a fluidized bed (22) comprising at least one grooved roller component (82), said strand(s) (81a) being in contact with part or all of the surface of said at least one grooved roller component (82) and said strand(s) (81a) comprising up to 0.1% by weight of sizing, and the control of the rate of said at least one thermoplastic polymer matrix in said fibrous material being done by controlling the dwell time of said fibrous material in the powder and by constant control of the tension of said strand(s) (81a) when it or they penetrate the fluidized bed.

Advantageously, the method according to the invention excludes any electrostatic method with deliberate charge.

The term "sizing" refers to the surface treatments applied to the fibrous materials during their manufacture. It may also refer to a fugitive pretreatment at the beginning of the pre-impregnation step, whether it is done directly in line with the impregnation or not. It may also refer to a fugitive pretreatment at the beginning of the pre-impregnation step, whether it is done directly in line with the impregnation or not.

They are generally organic in nature (thermosetting or thermoplastic resin type) and quite often formulated for the pre-impregnation of reinforcing fibers by polymers of low melting point Tm or thermosetting polymers of low Tg point.

These sizings are also used to protect the dry fibers from damage during contact with a guiding system.

Said fibrous material can therefore comprise up to 0.1% by weight of an organic material (thermosetting or thermoplastic resin type) called sizing.

In the case of a fugitive pretreatment done by the impregnator, for example at the beginning of the step for pre-impregnation of the reinforcing fibers, the sizing can be an organic liquid such as water, an alcohol of low or high molecular weight (ethanol, methanol, isopropanol for example), a ketone (acetone, etc.) which will serve as fugitive sizing; that is to say, it will be present for a short length of time in contact with the fiber to allow it to be manipulated in the "dry" state (i.e., before the pre-impregnation) and it will then be removed from the composite material so as not to disrupt the final characteristics of the composite.

Advantageously, said strand(s) (81a) is (are) not sized in particular in the case of an amorphous thermoplastic resin having a high Tg or a semi-crystalline resin with a high melting point: in these cases, the sizing degrades when it is subject to the high temperature of the transformation methods imposed by the nature of these resins.

This means that said strand(s) (81a) is (are) either substantially devoid of sizing due to the fact that the fibrous material has been de-sized beforehand or is devoid of sizing because the original fibrous material is non-sized.

For the de-sizing, several solutions exist:
heating in moisture-laden environment, since generally the sizings are deposited in solution with aqueous base during the manufacture of the fibers, since generally it is a treatment prior to the spools, otherwise it is necessary to place it in line with the pre-impregnation method:
a thermal degradation
a plunge of the sizing into a solvent (water or another organic solvent).

Advantageously, the average volume diameter D50 of the particles of thermoplastic polymer powder is from 30 to 300 µm, in particular from 50 to 200 µm, more particularly from 70 to 200 µm.

The expression "dwell time in the powder" means the time during which the strand is in contact with said powder in the fluidized bed.

The Inventors have unexpectedly found that when a non-sized fibrous material is used for the pre-impregnation step in a fluidized bed, controlling the dwell time in the powder was no longer sufficient to pre-impregnate the fibrous material with the thermoplastic polymer matrix, in particular homogeneously with a well-controlled powder (resin) level, and that the pre-impregnation step required the presence of one or several grooved roller(s) in the fluidized bed with simultaneous control of the tension of said fibrous material at the inlet of the fluidized bed.

There is a critical tension, called Tc, which leads to the damage of the fibers (fuzz), and a tension Tc' past which impregnation becomes impossible because the tension then blocks the spreading of the strand in the fluidized bed. Generally, in the case of non-sized fibers, Tc<Tc'.

There is also a Tmin, which is the tension below which twists appear.

Advantageously, the tension T of said strand(s) (81a) when it or they penetrate the fluidized bed is less than Tc.

Advantageously, the tension T of said strand(s) (81a) when it or they penetrate the fluidized bed is greater than Tmin.

Advantageously, the tension T of said strand(s) (81a) when it or they penetrate the fluidized bed is less than Tc and greater than Tmin.

Throughout the description, the fibrous material after passage in the fluidized bed is called pre-impregnated fibrous material, and after heating and/or calendaring, it is called impregnated fibrous material.

The measurements of the fiber content and the porosity are done on the impregnated fibrous material, and therefore after heating and/or calendaring.

The term "homogeneous" means that the pre-impregnation is uniform and that there are no dry fibers on the surface of the pre-impregnated fibrous material.

Polymer Matrix

Thermoplastic, or thermoplastic polymer, refers to a material that is generally solid at ambient temperature, which may be semi-crystalline or amorphous, and that softens during a temperature increase, in particular after going beyond its glass transition temperature (Tg) and flows at a higher temperature when it is amorphous, or that may exhibit a sharp transition upon passing its so-called melting temperature (Tm) when it is semi-crystalline, and becomes solid again when the temperature decreases below its crystallization temperature (for a semi-crystalline) and below its glass transition temperature (for an amorphous).

The Tg and Tm are determined by differential scanning calorimetry (DSC) according to standard 11357-2:2013 and 11357-3:2013, respectively.

Regarding the polymer constituting the pre-impregnation matrix of the fibrous material, it is advantageously a thermoplastic polymer or a mixture of thermoplastic polymers. This polymer or mixture of thermoplastic polymers is milled in powder form, so that it can be used in a device such as a tank, in particular in a fluidized bed.

The device in tank form, in particular in a fluidized bed, may be open or closed.

Optionally, the thermoplastic polymer or blend of thermoplastic polymers further comprises carbon-based fillers, in particular carbon black or carbon-based nanofillers, preferably selected from among carbon nanofillers, in particular graphenes and/or carbon nanotubes and/or carbon nanofibrils or their blends. These fillers make it possible to conduct electricity and heat, and therefore allow improving the lubrication of the polymer matrix when it is heated.

Optionally, said thermoplastic polymer comprises at least one additive, in particular selected from among a catalyst, an antioxidant, a heat stabilizer, a UV stabilizer, a light stabilizer, a lubricant, a filler, a plasticizer, a flame retardant, a nucleating agent, a chain extender and a dye, or a mixture thereof.

According to another variant, the thermoplastic polymer or mixture of thermoplastic polymers can further comprise liquid crystal polymers or cyclized polybutylene terephthalate, or mixtures containing the latter, such as the CBT100 resin marketed by CYCLICS CORPORATION. These compounds in particular make it possible to fluidize the polymer matrix in molten state, for better penetration to the core of the fibers. Depending on the nature of the polymer, or mixture of thermoplastic polymers, used to make the pre-impregnation matrix, in particular its melting temperature, one or the other of these compounds will be selected.

The thermoplastic polymers included in the composition of the pre-impregnation matrix of the fibrous material can be chosen from among:
- the polymers and copolymers from the family of aliphatic, cycloaliphatic or semi-aromatic polyamides (PA) (also called polyphthalamides (PPA)),
- polyureas, in particular aromatic polyureas,
- polymers and copolymers from the family of acrylics such as polyacrylates, and more particularly polymethyl methacrylate (PMMA) or derivatives thereof,
- polymers and copolymers from the polyaryletherketone (PAEK) family like poly(etheretherketone) (PEEK), or poly(aryletherketoneketones) (PAEKK) like poly(etherketoneketone) (PEKK) or derivatives thereof,
- aromatic polyether-imides (PEI),
- polyarylsulfides, in particular polyphenyl sulfides (PPS),
- polyarylsulfides, in particular polyphenylene sulfones (PPSU),
- polyolefins, in particular polypropylene (PP);
- polylactic acid (PLA),
- polyvinyl alcohol (PVA),
- fluorinated polymers, in particular polyvinylidene fluoride (PVDF), polytetrafluoroethylene (PTFE) or polychlorotrifluoroethylene (PCTFE), and mixtures thereof.

Advantageously, when said thermoplastic polymer is in mixture, it is added in powder form obtained beforehand by dry blend or ground compound or directly in the tank in the form of in situ dry blend.

Advantageously, it is added in powder form obtained beforehand by dry blend or directly in the tank in the form of in situ dry blend and the mixture is a mixture of PEKK and PEI.

Advantageously, when said polymer is a mixture of two polymers P1 and P2, the proportion by weight of polymer P1 and P2 is between 1-99% to 99-1%.

Advantageously, the PEKK/PEI mixture is from 90-10% to 60-40% by weight, in particular from 90-10% to 70-30% by weight.

The thermoplastic polymer can correspond to the final non-reactive polymer that will impregnate the fibrous material or to a reactive pre-polymer, which will also impregnate the fibrous material, but which may react with itself or with another pre-polymer, depending on the chain ends carried by said pre-polymer, after pre-impregnation, or with a chain extender and in particular during heating at rollers in the oven and/or during implementation of the tape in the final method for manufacturing the composite part.

According to a first possibility, said pre-polymer can comprise or consist of at least one carrier reactive pre-polymer (polyamide) on the same chain (that is to say, on the same pre-polymer), with two terminal functions X' and Y' that are respectively co-reactive functions relative to one another by condensation, more specifically with X' and Y' being amine and carboxy or carboxy and amine, respectively. According to a second possibility, said pre-polymer can comprise or consist of at least two polyamide pre-polymers that are reactive relative to one another and each respectively carry two identical terminal functions X' or Y' (identical for same pre-polymer and different between the two pre-polymers), said function X' of a pre-polymer being able to react only with said function Y' of the other pre-polymer, in particular by condensation, more specifically with X' and Y' being amine and carboxy or carboxy end amine, respectively.

According to a third possibility, said pre-polymer can comprise or consist of at least one pre-polymer of said thermoplastic polyamide polymer, carrying n terminal reactive functions X, selected from among: $-NH_2$, $-CO_2H$ and $-OH$, preferably $NH_2$ and $-CO_2H$ with n being 1 to 3, preferably from 1 to 2, more preferably 1 or 2, more particularly 2 and at least one chain extender Y-A'-Y, with A' being a hydrocarbon bisubstituent of non-polymeric structure bearing 2 identical terminal reactive functions Y, reactive by polyaddition with at least one function X of said prepolymer a1), preferably having a molecular mass less than 500, more preferably less than 400.

The number-average molecular weight Mn of said final polymer of the thermoplastic matrix is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said reactive prepolymers according to the two options given above, have a number-average molecular weight Mn ranging from 500 to 10000, preferably from 500 to 6000, in particular from 2500 to 6000.

The Mn are determined in particular by calculation from the rate of the terminal functions determined by potentiometric titration in solution and the functionality of said pre-polymers. The masses Mn can also be determined by steric exclusion chromatography or by NMR.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the person skilled in the art.

The polyamide can be a homopolyamide or a co-polyamide or a mixture thereof.

Advantageously, the polymers making up the matrix are selected from polyamides (PA), in particular selected from aliphatic polyamides, in particular PA11 and PA12, cycloaliphatic polyamides, and semi-aromatic polyamides (polyphthalamides) optionally modified by urea groups, and copolymers thereof, polymethylmethacrylate (PPMA) and copolymers thereof, polyether imides (PEI), and poly(phenylene sulfide) (PPS), poly(phenylene sulfone) (PPSU), polyetherketoneketone (PEKK), polyetheretherketone (PEEK), and fluorinated polymers like poly(vinylidene fluoride) (PVDF).

For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerisable with VDF. The VDF level must be over 80% by mass, even better 90% by mass, to provide good mechanical strength to the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ether ketone) PEEK, poly(ether ketone ketone) PEKK, Poly(ether ketone ether ketone ketone) PEKEKK or PA with a high glass transition temperature Tg) are advantageously used.

Advantageously, said thermoplastic polymer is a polymer whose glass transition temperature is such that Tg≥80° C., or a semi-crystalline polymer whose melting temperature Tm≥150° C.

Advantageously, said thermoplastic polymer is:
an aliphatic polyamide chosen from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), or a mixture thereof or a copolyamide thereof,
a semi-aromatic polyamide, optionally modified with urea units, particularly a semi-aromatic polyamide of formula X/YAr, as described in EP1505099, particularly a semi-aromatic polyamide of formula A/XT in which A is selected from a unit obtained from an amino acid, a unit obtained from a lactam and a unit corresponding to the formula (Ca diamine). (Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;
X.T denotes a unit obtained from the polycondensation of a Cx diamine and terephthalic acid, with x representing the number of carbon atoms of the Cx diamine, x being between 6 and 36, advantageously between 9 and 18, in particular a polyamide with formula A/6T, A/9T, A/10T or A/11T, A being as defined above, in particular a polyamide PA 6/6T, a PA 66/6T, a PA 61/6T, a PA MPMDT/6T, a PA MXDT/6T, a PA PA11/10T, a PA 11/6T/10T, a PA MXDT/10T, a PA MPMDT/10T, a PA BACT/10T, a PA BACT/6T, PA BACT/10T/6T, a PA 11/BACT/10T, PA 11/BACT/6T a PA 11/MPMDT/10T and a PA 11/MXDT/10T, and block copolymers, particularly polyamide/polyether (PEBA).

T corresponds to terephthalic acid, MXD corresponds to m-xylylene diamine, MPMD corresponds to methylpentamethylene diamine and BAC corresponds to bis(aminomethyl)cyclohexane.

Fibrous Material:

The fibers making up said fibrous material are in particular mineral, organic or plant fibers.

As already stated herein before, said fibrous material can therefore comprise up to 0.1% by weight of an organic material (thermosetting or thermoplastic resin type) called sizing.

Advantageously, said strand(s) (81a) is (are) non-sized.

This means that said strand(s) (81a) is (are) either substantially devoid of sizing due to the fact that the fibrous material has been de-sized beforehand or is devoid of sizing because the original fibrous material is non-sized. The mineral fibers include carbon fibers, glass fibers, basalt fibers, silica fibers, or silicon carbide fibers, for example. The organic fibers include thermoplastic or thermosetting polymer-based fibers, such as semi-aromatic polyamide fiber, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer matrix constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer matrix mixture constituting the pre-impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material can also be a fabric, a braid or woven with fibers.

It can also correspond to fibers with support threads.

These component fibers can be used alone or in mixtures. Thus, organic fibers can be mixed with the mineral fibers to be pre-impregnated with thermoplastic polymer powder and to form the pre-impregnated fibrous material.

The organic fiber strands can have several grammages. They can further have several geometries. The fibers can come in short fiber form, which then make up felts or nonwovens which can come in the form of strips, layers or pieces, or in continuous fiber form, which make up 2D fabrics, braids or strands of unidirectional (UD) or nonwoven fibers. The component fibers of the fibrous material can further assume the form of a mixture of these reinforcing fibers with different geometries. Preferably, the fibers are continuous.

Preferably, the fibrous material is composed of continuous carbon, glass or silicon carbide fibers or mixture thereof, in particular carbon fibers. It is used in the form of a strand or several strands.

The impregnated materials are also called "ready-to-use," and are obtained from the pre-impregnated fibrous material, after melting of the powder or the powder mixture. In this type of impregnated materials, the polymer or mixture of thermoplastic impregnation polymers is distributed so as to obtain minimum porosities, that is to say, minimum empty spaces between the fibers. Indeed, the presence of porosities in this type of material can act as stress concentration spots, during mechanical tensile stressing, for example, and which then form crack initiation points of the impregnated fibrous material and mechanically compromise it. A reduction in the porosity therefore improves the mechanical strength and homogeneity of the composite material formed from these pre-impregnated fibrous materials.

Thus, in the case of "ready to use" impregnated materials, the fiber level in said impregnated fibrous material is included between 45 to 65% by volume, preferably from 50 to 60% by volume, in particular from 54 to 60% by volume.

The impregnation level can be measured by image analysis (notably using a microscope or camera or digital camera), from a cross section of the band, by dividing the surface area of the band impregnated by the polymer by the total surface area of the product (impregnated surface area plus surface area of the porosities). In order to obtain a good quality image, it is preferable to coat the band cut in its transverse direction with a standard polishing resin and to polish with a standard protocol allowing the observation of the sample under a microscope with at least 6× magnification.

Advantageously, the porosity level of said impregnated fibrous material obtained after melting of the powder present in the pre-impregnated strand and impregnation to the core of the fibers, is from 0% to 30%, particularly from 1% to 10%, in particular from 1% to 5%.

The porosity level corresponds to the closed porosity level and can be determined either by electron microscopy, or as being the relative deviation between the theoretical density and the experimental density of said pre-impregnated fibrous material as described in the examples section of the present invention.

Pre-Impregnation Step:

An example of a unit for implementing the manufacturing method is described in international application WO 2015/121583 and is shown in FIG. 1, with the exception of the tank (otherwise called pre-impregnation tank which, in the case of the invention, comprises a fluidized bed provided with a grooved roller component (FIG. 3) which may be a grooved cylindrical roller (FIG. 4)).

In FIGS. 1 to 9, in which the roller component or the roller are perpendicular to the fluidized bed, the groove is not visible. It is only visible in front view (FIGS. 2 and 4).

All the cylindrical rollers shown in FIGS. 1 to 9 are grooved.

The groove can assume any shape and has a width smaller than the width which the strand would have if the roller were smooth and cylindrical, with a diameter equal to the diameter at the groove bottom, under the same fluidization conditions of the powder and tension conditions of the strand.

The cylindrical roller can be stationary or in controlled rotation, that is to say, not free.

Several rollers can be present, and if they are in controlled rotation, they can be co-rotating or contra-rotating.

The step for pre-impregnation of the fibrous material is carried out by passage of one or more strands in a continuous pre-impregnation device, comprising a tank (20), comprising a fluidized bed (22) of polymer powder.

The powder of polymer(s) or polymer is suspended in a gas G (air, for example) introduced into the tank and circulating in the tank through a hopper 21. The strand(s) are circulated in this fluidized bed 22.

The tank can have any shape, in particular cylindrical or parallelepiped, particularly a rectangular parallelepiped or a cube, advantageously a rectangular parallelepiped.

The tank can be an open or closed tank. Advantageously, it is open.

In the event the tank is closed, it is then equipped with a sealing system so that the polymer powder cannot leave said tank.

This pre-impregnation step is therefore carried out by a dry process, that is to say, the thermoplastic polymer matrix is in powder form, in particular suspended in a gas, particularly air, but cannot be dispersed in a solvent or water.

Each strand to be pre-impregnated is unwound from a device (10) with reels (11) under the traction created by cylinders (not shown). Preferably, the device (10) comprises a plurality of reels (11), each reel making it possible to unwind a strand to be impregnated. Thus, it is possible to pre-impregnate several fiber strands at once. Each reel (11) is provided with a brake (not shown) so as to apply tension on each fiber strand. In this case, an alignment module (12) makes it possible to position the fiber strands parallel to one another. In this way, the fiber strands cannot be in contact with one another, which makes it possible to avoid mechanical damage to the fibers by friction relative to one another.

The strand of fibers or the parallel strands of fibers then enter a tank (20), in particular comprising a fluidized bed (22), provided with a grooved roller component that is a cylindrical roller having several grooves (one per strand) (23) in the case of FIG. 1. The strand of fibers or the parallel strands of fibers s then leave(s) the tank after impregnation after controlling the dwell time in the powder and by constant control of the tension of said strand(s) (81*a*) when it or they penetrate the fluidized bed.

Advantageously, the tension of said strand(s) (81*a*) when it or they penetrate the fluidized bed is up to 1000 g.

The tension of said strand can be measured either manually and intermittently at several points of the line using a tensiometer, or using strain gauges incorporated into elements in contact with the strands.

Advantageously, the tension of said strand(s) (81*a*) when it or they penetrate the fluidized bed is from 100 to 1000 g, in particular from 200 to 1000 g, more particularly from 300 to 850 g.

In one embodiment, said pre-impregnation step is carried out with simultaneous spreading of said strand(s) (81*a*) between the inlet and the outlet of said fluidized bed (22).

Advantageously, the minimum width of said strand(s) (81*a*) is greater than the width of the groove of said grooved roller component.

The tension applied to the fiber strand(s) must be sufficient for the minimum width of the free strand to be greater than the width of the groove, so as always to fill the entire groove with the fiber strand. The minimum width of the strand refers to the width which the strand would have under the same tension and fluidization conditions of the powder, on a smooth roller with the same diameter as that of the groove bottoms. This width can advantageously be measured by different methods, even on rollers completely submerged in the powder, such as with pressure sensors, with position sensors (LVDT type) on a smooth roller to then be transposed to the use of a grooved roller whereof the groove width will be smaller than the minimum value read using sensors.

The choice of the tension and groove width pairing will be optimum when the tension is minimum and the impregnation of the strand is good, however beyond 100 g, preferably beyond 200 g, at the creel outlet, so as to prevent the formation and/or the passage of twists.

The Inventors have unexpectedly found that when a non-sized fibrous material is used for the impregnation step in a fluidized bed, controlling the dwell time in the powder was no longer sufficient to impregnate the fibrous material with the thermoplastic polymer matrix, in particular to the core and homogeneously with a well-controlled powder (resin) level, and that the pre-impregnation step required the presence of one or several grooved roller components, in particular one or several grooved roller(s) in the fluidized bed with simultaneous control of the tension of said fibrous material at the inlet of the fluidized bed.

They have also found that simultaneously controlling the tension of said fibrous material at the inlet of the fluidized bed such that the minimum width of said strand is always greater than the width of the groove of said roller component, in particular of said grooved cylindrical roller, allowed the impregnation of said fibrous material by the thermoplastic polymer matrix, in particular to the core and homogeneously with a well-controlled (resin) powder level.

"Grooved roller component" refers to any system on which the strand can pass in the tank and which has a groove. The roller component can have any shape as long as it is grooved and the strand can pass in the groove.

Advantageously, the size of the grooves is just smaller than the minimum width of the fiber strand.

An example of roller component, without restricting the invention thereto, is described in detail in FIG. 3.

This impregnation is done in order to allow the polymer powder to penetrate to the core of the fiber strand and to adhere to the fibers sufficiently to support the transport of the powdered strand outside the tank. The strand(s) pre-impregnated with the powder is (are) next directed to a heating calendering device, with the possibility of pre-heating before calendering, and optional heating post-calendering.

Optionally, this pre-impregnation step can be supplemented with a step of covering the pre-impregnated strand(s) just as they exit the tank (20) for pre-impregnation by the powder in the fluidized bed (22), and just before the step of shaping by calendering. To that end, the outlet chamber of the tank (20) (fluidized bed 22) can be connected to a covering device (30) that may comprise a covering crosshead-die head, as is also described in patent EP0406067. The covering polymer may be identical to or different from the polymer powder in the fluidized bed. Preferably, it is of the same nature. Such covering makes it possible not only to supplement the pre-impregnation step of the fibers in order to obtain a final volume rate of polymer in the desired range and to prevent the presence, on the surface of the pre-impregnated strand, of a fiber level that is locally too high, which would be detrimental to the welding of the tapes during the manufacture of the composite part, in particular to obtain "ready to use" fibrous materials of good quality, but also to improve the performance of the composite material obtained.

The inventive method as indicated above is advantageously carried out by the dry process, excluding a deliberately-charged electrostatic method.

The expression "deliberately charged" means that a difference in potential is applied between the fibrous material and the powder. The charge is in particular controlled and amplified. The grains of powder then impregnate the fibrous material by attraction of the powder charged opposite the fiber. It is possible to charge the powder electrically, negatively or positively, by different means (difference in potential between two metallic electrodes, mechanical friction on metallic parts, etc.), and to charge the fiber inversely (positively or negatively).

The inventive method does not preclude the presence of electrostatic charges that may appear by friction of the fibrous material on the elements of the implementation unit before or at the tank but that are in any case involuntary charges.

Advantageously, the fiber level in said impregnated fibrous material is from 45 to 65% by volume, preferably from 50 to 60% by volume, in particular from 54 to 60% by volume.

Below 45% fibers, the reinforcement is not of interest regarding the mechanical properties.

Above 65%, the limitations of the method are reached and the mechanical properties are lost again.

Advantageously, the fiber level in said impregnated fibrous material is from 50 to 60%, in particular from 54 to 60% by volume.

Advantageously, the dwell time in the powder is from 0.01 s to 10 s, preferably from 0.1 s to 5 s, and in particular from 0.1 s to 3 s.

The dwell time of the fibrous material in the powder is essential to control the resin content of said fibrous material.

Below 0.1 s, the resin content will be too low in order, during the next step of melting of the powder, to be able to impregnate the fibers to the core.

Beyond 10 s, the polymer matrix level impregnating the fibrous material is too high and mechanical properties of the impregnated fibrous material will be poor.

Advantageously, the tank used in the inventive method comprises a fluidized bed and said pre-impregnation step is carried out with simultaneous spreading of said strand(s) between the inlet and the outlet of said tank.

The expression "inlet of said tank" corresponds to the vertical tangent of the edge of the tank that comprises the fluidized bed.

The expression "outlet of said tank" corresponds to the vertical tangent of the other edge of the tank that comprises the fluidized bed.

Based on the geometry of the tank, the distance between the inlet and the outlet thereof therefore corresponds to the diameter in the case of a cylinder, to the side in the case of a cube, or to the width or length in the case of a rectangular paralleliped. The spreading consists in isolating each filament constituting said strand as much as possible from the other filaments which surround it in the space closest thereto. It corresponds to the transverse spreading of the strand.

In other words, the transverse spreading or the width of the strand increases between the inlet of the fluidized bed (or the tank comprising the fluidized bed) and the outlet of the fluidized bed (or the tank comprising the fluidized bed) and thus allows a homogeneous pre-impregnation of the fibrous material.

The fluidized bed can be open or closed, in particular it is open.

Advantageously, the fluidized bed comprises at least one roller component, said strand(s) being in contact with part or all of the surface of said at least one roller component.

FIG. 3 describes a tank (20) comprising a fluidized bed (22) with a roller component, the height (82) of which is adjustable.

The strand (81a) corresponds to the strand before impregnation that is in contact with part or all of the surface of said at least one roller component and therefore passes at least partially or wholly over the surface of the roller component (82), said system (82) being submerged in the fluidized bed where the impregnation is done. Said strand then leaves the tank (81b) after control of the dwell time in the powder.

Said strand (81a) may or may not be in contact with the edge of the tank (83a), which can be a rotating or stationary roller, or a parallelepipedal edge.

Advantageously, said strand (81a) is or is not in contact with the edge of the tank (83a).

Advantageously, the edge of the tank (83b) is a roller, in particular cylindrical and rotating.

Said strand (81b) may or may not be in contact with the edge of the tank (83b), which can be a roller, in particular cylindrical and rotating or stationary, or a parallelepipedal edge.

Advantageously, said strand (81b) is in contact with the edge of the tank (83b).

Advantageously, the edge of the tank (83b) is a roller, in particular cylindrical and rotating.

Advantageously, said strand (81a) is in contact with the edge of the tank (83a) and the edge of the tank (83b) is a roller, in particular cylindrical and rotating, and said strand (81b) is in contact with the edge of the tank (83b), and the edge of the tank (83b) is a roller, in particular cylindrical and rotating.

Advantageously, said roller component is perpendicular to the direction of said strand(s).

Advantageously, said spreading of said strand(s) is done at least at said at least one roller component.

The spreading of the strand is therefore done primarily at the roller component, but can also be done at the edge(s) of the tank if there is contact between the strand and said edge.

In another embodiment, said at least one roller component is a grooved cylindrical roller with a convex, concave or cylindrical shape.

The convex shape is favorable to the spreading, while the concave shape is unfavorable to the spreading, although it nevertheless occurs.

The expression "grooved cylindrical roller" means that the strand that passes bears partially or wholly on the surface of said grooved cylindrical roller, which causes the spreading of said strand.

Advantageously, said at least one grooved cylindrical roller is cylindrical in shape and the spreading percentage of said strand or of said strands between the inlet and the outlet of said fluidized bed is from 1% to 400%, preferably between 30% and 400%, preferably between 30% and 150%, preferably between 50% and 150%. The spreading percentage is defined as (Lf-Li)/Li*100, where Li and Lf are the widths before and after spreading.

The spreading depends on the fibrous material used. For example, the spreading of a material made from carbon fiber is much greater than that of a linen fiber.

The spreading also depends on the number of fibers or filaments in the strand, their average diameter and their cohesion.

The diameter of said at least one grooved cylindrical roller is from 3 mm to 500 mm, preferably from 10 mm to 100 mm, in particular from 20 mm to 60 mm.

Below 3 mm, the deformation of the fiber caused by the grooved cylindrical roller is too great.

Advantageously, the grooved cylindrical roller is cylindrical and not ribbed, and is in particular metallic.

When the roller component is at least one grooved cylindrical roller, according to a first variant, a single grooved cylindrical roller is present in the fluidized bed and said impregnation is carried out at the angle $\alpha_1$ formed by said strand(s) between the inlet of said grooved cylindrical roller and the vertical tangent to said grooved cylindrical roller.

The angle $\alpha_1$ formed by said strand(s) between the inlet of said grooved cylindrical roller and the vertical tangent to said grooved cylindrical roller allows the formation of an area in which the powder will concentrate, thus leading to a "corner effect" that, with the simultaneous spreading of the strand by said grooved cylindrical roller, allows a pre-impregnation over a greater strand width and therefore an improved pre-impregnation compared to the techniques of the improved prior art. Coupling with the controlled dwell time thus enables a homogeneous pre-impregnation.

Advantageously, the angle 1 is comprised from 0 to 89°, preferably 5° to 85°, preferably 5° to 45° and preferably 5° to 30°.

Nevertheless, an angle $\alpha_1$ comprised from 0 to 5° is likely to give rise to risks of mechanical stress, which will lead to breakage of fibers and an angle $\alpha_1$ comprised from 85° to 89° does not create sufficient mechanical force for creating "the corner effect."

A value of the angle $\alpha_1$ equal to 0° therefore corresponds to a vertical fiber. It is clear that the height of the cylindrical grooved cylindrical roller is adjustable, thus making it possible to position the fiber vertically.

It would not be outside the scope of the invention if the wall of the tank were pierced so as to be able to allow the exit of the strand.

Advantageously, the edge of the tank (83a) is equipped with a roller, in particular cylindrical and rotating, on which said strand(s) pass(es), thus leading to prior spreading.

Advantageously, one or more roller components are present downstream of the tank comprising the fluidized bed at which the spreading is initiated.

Advantageously, the spreading is initiated at said roller component(s) defined above and continues at the edge of the tank (83a).

The spreading is then maximal after passage at the grooved cylindrical roller(s).

FIG. 4 describes, but is not limited to, an embodiment with a single grooved cylindrical roller, with a tank (20) comprising a fluidized bed (22) in which a single cylindrical grooved cylindrical roller is present and showing the angle $\alpha_1$.

The arrows at the fibre indicate the direction of travel of the fiber.

Advantageously, the level of said powder in said fluidized bed is at least located at mid-height of said grooved cylindrical roller.

It is obvious that "the corner effect" caused by the angle di enhances the pre-impregnation on one surface but the spreading of said strand obtained with the grooved cylindrical roller also makes it possible to have a pre-impregnation on the other surface of said strand. In other words, said pre-impregnation is enhanced on one face of said strand or strands near the angle $\alpha_1$ formed by said strand or strands between the entry to said at least one grooved cylindrical roller $R_1$ and the vertical tangent to the grooved cylindrical roller $R_1$ but the spreading also makes pre-impregnation of the other face possible.

The angle $\alpha_1$ is as defined above.

According to a second variant, when the roller component is at least one grooved cylindrical roller, then two grooved cylindrical rollers $R_1$ and $R_2$ are in said fluidized bed and said pre-impregnation is done at the angle 1 formed by said strand(s) between the inlet of said grooved cylindrical roller $R_1$ and the vertical tangent to said grooved cylindrical roller $R_1$ and/or at the angle $\alpha_2$ formed by said strand(s) between the inlet of said grooved cylindrical roller $R_2$ and the vertical tangent to said grooved cylindrical roller $R_2$, said grooved cylindrical roller $R_1$ preceding said grooved cylindrical roller $R_2$ and said strand(s) being able to pass above (FIGS. 5 and 6) or below (FIGS. 7 and 8) the roller $R_2$.

Advantageously, the two grooved cylindrical rollers have identical or different shapes and are chosen from among a convex, concave or cylindrical shape.

Advantageously, the two grooved cylindrical rollers are identical and cylindrical, and in particular metallic.

The diameter of the two grooved cylindrical rollers can also be identical or different and is as defined above.

Advantageously, the diameter of the two grooved cylindrical rollers is identical.

The two grooved cylindrical rollers $R_1$ and $R_2$ can be at the same level relative to one another and relative to the bottom of the tank (FIGS. 6 and 7) or offset relative to one another and relative to the bottom of the tank, the height of the grooved cylindrical roller $R_1$ being higher or lower than that of the grooved cylindrical roller $R_2$ relative to the bottom of the tank (FIGS. 5 and 8).

Advantageously, when the two rollers are at different heights and the strand passes above the roller $R_2$, $\alpha_2$ is then from 0 to 90°.

Advantageously, said pre-impregnation is then done at the angle $\alpha_1$ formed by said strand(s) between the inlet of said grooved cylindrical roller $R_1$ in the vertical tangent to said grooved cylindrical roller on a face of said strand and the angle $\alpha_2$ formed by said strand(s) between the inlet of said grooved cylindrical roller $R_2$ and the vertical tangent to said grooved cylindrical roller $R_2$ on the opposite face of said strand, which is obtained by passing above the roller $R_2$.

Advantageously, said strand in this embodiment is subject to spreading at each angle $\alpha_1$ and $\alpha_2$.

FIG. 6 describes, but is not limited to, an embodiment with two grooved cylindrical rollers $R_1$ and $R_2$, $R_1$ preceding $R_2$, with a tank (20) comprising a fluidized bed (22) in which the two cylindrical grooved cylindrical rollers, at the same level and side by side, are present and showing the case where said strand(s) come out between said grooved cylindrical rollers $R_1$ and $R_2$.

In this case, the angle $\alpha_2$ is equal to 0 and said strand(s) pass above the roller $R_2$.

The arrows at the fibre indicate the direction of travel of the fiber.

Alternatively, said strand(s) pass(es) at the inlet between said grooved cylindrical rollers $R_1$ and $R_2$ and come(s) out after having been in contact with part or all of the surface of said grooved cylindrical roller $R_2$.

Advantageously, said strand(s) is (are) in contact at the inlet with part or all of the surface of said grooved cylindrical roller $R_1$ and come(s) out outside the grooved cylindrical roller $R_2$ after having been in contact with part or all of the surface of said grooved cylindrical roller $R_2$, beneath the roller $R_2$, the angle $\alpha_2$ being formed by said strand(s) between the inlet of said grooved cylindrical roller $R_2$ and the vertical tangent to said grooved cylindrical roller $R_2$. In this case, the angle $\alpha_2$=90°.

Said pre-impregnation is therefore done at the angle $\alpha_1$ formed by said strand(s) between the inlet of said grooved cylindrical roller $R_1$ and the vertical tangent to said grooved cylindrical roller on one face of said strand and the angle $\alpha_2$ formed by said strand(s) between the inlet of said grooved cylindrical roller $R_2$ and the vertical tangent to said grooved cylindrical roller $R_2$ on the same face of said strand, but the spreading also makes it possible to pre-impregnate the other face.

Advantageously, said strand in this embodiment is subject to spreading at each angle $\alpha_1$ and $\alpha_2$.

FIG. 7 shows an exemplary embodiment with two grooved cylindrical rollers $R_1$ and $R_2$ at the same level with respect to one another.

According to another embodiment of the second variant, when two grooved cylindrical rollers are present, then the distance between the two grooved cylindrical rollers $R_1$ and $R_2$ is from 0.15 mm to the length equivalent to the maximum dimension of the tank, preferably from 10 mm to 50 mm, and the height difference between the two grooved cylindrical rollers $R_1$ and $R_2$ is from 0 to the height corresponding to the maximum height of the tank subtracted from the diameters of the two grooved cylindrical rollers, preferably from 0.15 mm to the height corresponding to the maximum height of the tank subtracted from the diameters of the two grooved cylindrical rollers, more preferably a height difference between 10 mm and 300 mm, $R_2$ being the upper grooved cylindrical roller.

Advantageously, when two grooved cylindrical rollers are present and at the same level relative to one another, the level of said powder in said fluidized bed is at least located at mid-height of said two grooved cylindrical rollers.

FIG. 8 describes, but is not limited to, an embodiment with two grooved cylindrical rollers $R_1$ and $R_2$, $R_1$ preceding $R_2$, with a tank (20) comprising a fluidized bed (22) in which two cylindrical grooved cylindrical rollers at different levels are present and showing the angle $\alpha_1$ and $\alpha_2$.

The diameter of the grooved cylindrical rollers $R_1$ and $R_2$ is shown as identical in FIGS. 5, 6, 7 and 8, but the diameter of each cylindrical grooved cylindrical roller can be different, the diameter of the grooved cylindrical roller $R_1$ being able to be larger or smaller than that of the grooved cylindrical roller $R_2$ in the range as defined above.

Advantageously, the diameter of the two grooved cylindrical rollers is identical.

It would not be going beyond the scope of the invention if the grooved cylindrical roller $R_1$ were larger than the grooved cylindrical roller $R_2$.

According to a third variant, when two grooved cylindrical rollers are present and at different levels, then at least one third grooved cylindrical roller $R_3$ is also present and located between the grooved cylindrical rollers $R_1$ and $R_2$ in the height direction (FIG. 9).

Advantageously, said strand(s) is (are) in contact at the inlet with part or all of the surface of said grooved cylindrical roller $R_1$, then with part or all of the surface of said grooved cylindrical roller $R_3$, and come(s) out after having been in contact with part or all of the surface of said grooved cylindrical roller $R_2$.

Advantageously, said pre-impregnation is done on one face of said strand(s) at the angle $\alpha_1$ formed by said strand(s) between the inlet of said at least one grooved cylindrical roller $R_1$ and the vertical tangent to said grooved cylindrical roller $R_1$ as well as at the angle $\alpha_3$ formed by said strand(s)

and the vertical tangent to said grooved cylindrical roller $R_3$ and on the other face at the angle $\alpha_2$ formed by said strand(s) and the vertical tangent to said grooved cylindrical roller $R_2$.

Advantageously, when two grooved cylindrical rollers are present at different levels and at least one third grooved cylindrical roller $R_3$ is also present, then the angle $\alpha_2$ formed by said strand(s) between the inlet of said at least one grooved cylindrical roller $R_2$ and the vertical tangent to said grooved cylindrical roller $R_2$ is from 180° to 45°, in particular from 120° to 60°.

Advantageously, the angle $\alpha_3$ is from 0° to 180°, advantageously from 45° to 135°.

FIG. 9 describes an embodiment, without being limited thereto, with a tank (20) comprising a fluidized bed (22) with two grooved cylindrical rollers $R_1$ and $R_2$, $R_1$ preceding $R_2$, and a third grooved cylindrical roller $R_3$ and showing the angles $\alpha_1$, $\alpha_2$ and $\alpha_3$.

The diameter of the grooved cylindrical rollers $R_1$, $R_2$ and $R_3$ is shown as identical in FIG. 9, but the diameter of each cylindrical grooved cylindrical roller can be different, or two grooved cylindrical rollers can have the same diameter and the third can have a different, larger or smaller, diameter, in the range as defined above.

Advantageously, the diameter of the three grooved cylindrical rollers is identical.

Advantageously, in this third variant, a second control of the spreading of said strand(s) is done at the grooved cylindrical roller $R_3$ and a third control of the spreading is done at the grooved cylindrical roller $R_3$.

The dwell time in this third variant is as defined above.

Advantageously, in this third variant, the level of said powder in said fluidized bed is at least located at mid-height of said grooved cylindrical roller $R_2$.

It would not be outside the scope of the invention if, in this third variant, said strand(s) is (are) in contact at the inlet with part or all of the surface of said grooved cylindrical roller $R_1$, then with part or all of the surface of said grooved cylindrical roller $R_2$, and come(s) out after having been in contact with part or all of the surface of said grooved cylindrical roller $R_3$.

According to one advantageous embodiment, the present invention relates to a method as defined above, characterized in that a single thermoplastic polymer matrix is used and the thermoplastic polymer powder is fluidizable.

The term "fluidizable" means that the air flow rate applied to the fluidized bed is between the minimum fluidization flow rate (Umf) and the minimum bubbling flow rate (Umf) as shown in FIG. 12.

Below the minimum fluidization flow rate, there is no fluidization, the polymer powder particles fall into the bed and are no longer in suspension, and the method according to the invention cannot operate.

Above the minimum bubbling flow rate, the powder particles fly away and the constant composition of the fluidized bed can no longer be kept constant.

Advantageously, the volume diameter D90 of the particles is from 50 to 500 μm, advantageously from 120 to 300 μm.

Advantageously, the volume diameter D10 of the particles is from 5 to 200 μm, advantageously from 35 to 100 μm.

Advantageously, the volume diameter of the particles of powder is in the ratio D90/D10, or from 1.5 to 50, advantageously from 2 to 10.

Advantageously, the average volume diameter D50 of the particles of thermoplastic polymer powder is from 30 to 300 μm, in particular from 50 to 200 μm, more particularly from 70 to 200 μm.

The volume diameters of the particles (D10, D50 and D90) are defined according to standard ISO 9276:2014.

"D50" corresponds to the volume-average diameter, that is to say, the value of the particle size that divides the examined population of particles exactly in half.

"D90" corresponds to the value at 90% of the cumulative curve of the particle size distribution by volume.

"D10" corresponds to the corresponds to the size of 10% of the volume of the particles.

According to another embodiment of the method according to the invention, a creel is present before the tank comprising a fluidized bed to control the tension of the strand(s) at the inlet of the tank comprising a fluidized bed.

Optionally, in the method according to the invention, one or more roller components are present after the tank comprising the fluidized bed.

Optionally, grooved rollers at the inlet and the outlet of the tank containing the fluidized bed can be used.

Heating Step

In another embodiment, the present invention relates to a method as defined above, characterized in that it further comprises at least one step of heating the thermoplastic matrix allowing said thermoplastic polymer to be melted or kept in melt condition after pre-impregnation, the at least one heating step being carried out by means of at least one heat-conducting or non-heat-conducting roller component (E) and at least one heating system, with the exception of a heating calender, said strand or strands being in contact with part or all of the surface of said at least one roller component (E) and partially or totally running over the surface of said at least one roller component (E) at the level of the heating system.

It would not be outside the scope of the invention if the roller component (E) was positioned in a oven including a heating system, for example by IR heating, but said roller component was not positioned exactly below the heating elements, for example by IR heating. It would not be outside the scope of the invention if the oven included a convection heating mode and an IR heating system.

It would also not be outside the scope of the invention if said roller component (E) placed in this oven or in the environment of this oven was equipped with an autonomous heating means such as a resistance making it possible to heat said roller component (E), independently for example of the radiation from the IR lamps and the natural convection of the oven and, in light of the speed of the line, the polymer present in the bands or the strands is still in the molten state when it arrives in contact with said roller component.

The height between the heating system and the roller components is between 1 and 100 cm, preferably from 2 to 30 cm, and in particular from 2 to 10 cm.

A first heating step can be immediately consecutive to the pre-impregnation step or else other steps can take place between the pre-impregnation step and the heating step.

Nevertheless, the first step of implementation by a heating system provided with at least one roller component (E) does not correspond to a heating calender, and is always done before the calendering step, which is necessary to smooth and shape the band.

Advantageously, said first heating step immediately follows the pre-impregnation step. The expression "immediately follows" means that there is no intermediate step between the pre-impregnation step and said heating step.

Advantageously, a single heating step is done, immediately following the pre-impregnation step.

Advantageously, said at least one heating system is selected from an infrared bulb, a UV bulb and convection heating if the roller component is heat conducting.

The fibrous material being in contact with the roller component(s) and the heating system, and the roller component being conductive, the heating system therefore also works by conduction.

Advantageously, said at least one heating system is chosen from an infrared bulb.

Advantageously, if the roller component is non-heat-conducting, said at least one heating system is selected from microwave heating, laser heating and High Frequency (HF) heating.

The non-heating and non-heat-conducting roller component (E) does not absorb at the wavelength of the microwave, laser or HF heating system.

Advantageously, said at least one heating system is selected from microwave heating.

Advantageously, said at least one roller component (E) is a compression roller R'i with a convex, concave or cylindrical shape.

It should be noted that the compression rollers corresponding to the roller components (E) and those used for the pre-impregnation step can be identical or different whether in terms of the material or shape and its characteristics (diameter, length, width, height, etc., depending on the shape).

The convex shape is favorable to the spreading, while the concave shape is unfavorable to the spreading, although it nevertheless occurs.

The at least one roller component (E) can also have an alternating convex and concave shape. In this case, the passage of the strand over a convex compression roller causes the spreading of said strand, then the passage of the strand over a concave compression roller causes the retraction of the strand, and so forth, making it possible, if needed, to improve the homogeneity of the impregnation, in particular to the core.

The expression "compression roller" means that the strand that passes bears partially or totally on the surface of said compression roller, which causes the spreading of said strand.

The rollers can be in controlled rotation or stationary.

They are grooved and the bottom of the groove can be smooth or striated.

Shaping Step

Optionally, a step for shaping the strand or said parallel strands of said impregnated fibrous material is done.

A calendaring system as described in WO 2015/121583 can be used.

Advantageously, it is done by calendering using at least one heating calender in the form of a single unidirectional band or sheet or a plurality of parallel unidirectional bands or sheets with, in the latter case, said heating calender including a plurality of calendering grooves, preferably up to 200 calendering grooves, in accordance with the number of said bands and with a pressure and/or separation between the rollers of said calender regulated by a closed-loop control system.

This step is always done after the heating step if there is only one or between the first heating step and the second heating step when the two coexist.

Advantageously, the calendaring step is done using a plurality of heating calendars, mounted in parallel and/or in series relative to the direction of travel of the fiber strands.

Advantageously, said heating calendar(s) comprise(s) an integrated induction or microwave heating system, preferably microwave, coupled with the presence of carbon fillers in said thermoplastic polymer or mixture of thermoplastic polymers.

According to another embodiment, a belt press is present between the heating system and the calendar.

According to still another embodiment, a heating nozzle is present between the heating system and the calendar.

According to another embodiment, a belt press is present between the heating system and the calendar and a heating nozzle is present between the belt press and the calendar.

Advantageously, the step for shaping said parallel strand(s) of said pre-impregnated fibrous material, by calendering using at least one heating calender in the form of a single unidirectional band or sheet or a plurality of parallel unidirectional bands or sheets with, in the latter case, said heating calender including a plurality of calendering grooves, preferably up to 300 calendering grooves, in accordance with the number of said bands and with a pressure and/or separation between the rollers of said calender regulated by a closed-loop control system.

Advantageously, the calendaring step is done using a plurality of heating calendars, mounted in parallel and/or in series relative to the direction of travel of the fiber strands.

Advantageously, said heating calendar(s) comprise(s) an integrated induction or microwave heating system, preferably microwave, coupled with the presence of carbon fillers in said thermoplastic polymer or mixture of thermoplastic polymers.

In one embodiment, said heating calender(s) is (are) coupled to a complementary heating device, located before and/or after said (each) calender, in particular a microwave or induction heating device coupled with the presence of carbon-based fillers in said polymer or in said mixture of polymers, or an infrared IR or laser heating device or a device for heating by direct contact with another source of heat such as a flame or a hot gas.

In another embodiment, said pre-impregnation step(s) is (are) supplemented by a step of covering said single strand or said plurality of parallel strands after pre-impregnation by the powder, said covering step being carried out before said calendering step, with a molten thermoplastic polymer, which may be identical to or different from said polymer in powder form in fluidized bed, said molten polymer preferably being of the same nature as said polymer in powder form in fluidized bed, preferably with said covering being effected by crosshead-die extrusion relative to said single strand or said plurality of parallel strands.

According to another aspect, the present invention relates to a unidirectional band or sheet of impregnated fibrous material, in particular a band or sheet wound on a spool, characterized in that it is obtained using a method as defined hereinbefore.

Advantageously, the band or the sheet has a width (I) and a thickness (ep) suitable for deposition by robot in the manufacture of three-dimensional parts, and preferably has a width (I) of at least 5 mm and which can range up to 600 mm, preferably from 50 to 600 mm and even more preferably from 50 to 300 mm.

The robot deposition can be carried out with or without slitting.

Advantageously, the thermoplastic polymer of the band or sheet is a polyamide selected from, in particular, an aliphatic polyamide such as a PA 6, PA 11, PA 12, PA 66, PA 46, PA 610, PA 612, PA 1010, PA 1012, PA 11/1010 or PA 12/1010 or a semi-aromatic polyamide such as a PA MXD6 and a PA MXD10 or selected from PA 6/6T, a PA 66/6T, a PA 61/6T, a PA MPMDT/6T, a PA MXDT/6T, a PA PA11/10T, a PA 11/6T/10T, a PA MXDT/10T, a PA MPMDT/10T, a PA BACT/10T, a PA BACT/6T, PA BACT/10T/6T, PA BACT/6T/11 a PA 11/BACT/10T, a PA 11/MPMDT/10T and a PA 11/MXDT/10T, a PVDF, a PEEK, PEKK and a PEI or a mixture thereof.

According to another aspect, the present invention relates to the use of a method as defined hereinbefore, for the manufacture of calibrated bands or sheets suitable for the manufacture of three-dimensional composite parts, by the automatic deposition of the said bands or sheets by means of a robot.

According to another aspect, the present invention relates to the use of the band or sheet of impregnated fibrous material, as defined hereinabove, in the manufacture of three-dimensional composite parts.

Said impregnated band is therefore obtained from a pre-impregnated band after the heating step described hereinbefore.

Advantageously, said manufacture of said composite parts relates to the fields of transportation, in particular automotive, oil and gas, in particular offshore, gas storage, civil or military aeronautics, aerospace, nautical, rail; renewable energies, in particular wind energy, tidal energy, energy storage devices, solar panels; thermal protection panels; sports and recreation, health and medical, security and electronics.

According to yet another aspect, the present invention relates to a three-dimensional composite part, characterized in that it results from the use of at least one unidirectional band of impregnated fibrous material as defined hereinabove.

Advantageous Embodiments of the Inventive Method

Advantageously, the fibrous material is selected from carbon fiber and glass fiber.

Advantageously, the thermoplastic polymer used to impregnate the carbon fiber is selected from a polyamide, in particular an aliphatic polyamide such as PA 11, PA 12, PA 11/1010 or PA 12/1010, or a semi-aromatic polyamide, in particular PA MXD6 and PA MXD10 or selected from PA 6/6T, a PA 66/6T, a PA 61/6T, a PA MPMDT/6T, a PA MXDT/6T, a PA PA11/10T, a PA 11/6T/10T, a PA MXDT/10T, a PAMPMDT/10T, a PA BACT/10T, a PA BACT/6T, PA BACT/10T/6T, PA BACT/6T/11, a PA 11/BACT/10T, a PA 11/MPMDT/10T and a PA 11/MXDT/10T, a PVDF, a PEEK, PEKK and a PEI or a mixture thereof.

Advantageously, the thermoplastic polymer used to impregnate the glass fiber is selected from a polyamide, in particular an aliphatic polyamide such as PA 11, PA 12, PA 11/1010 or PA 12/1010, or a semi-aromatic polyamide, in particular PA MXD6 and PA MXD10 or selected from PA 6/6T, a PA 66/6T, a PA 61/6T, a PA MPMDT/6T, a PA MXDT/6T, a PA PA11/10T, a PA 11/6T/10T, a PA MXDT/10T, a PAMPMDT/10T, a PA BACT/10T, a PA BACT/6T, PA BACT/10T/6T, PA BACT/6T/11, a PA 11/BACT/10T, a PA 11/MPMDT/10T and a PA 11/MXDT/10T, a PVDF, a PEEK, PEKK and a PEI or a mixture thereof.

Advantageously, the fiber level in said impregnated fibrous material, consisting of carbon or glass fiber, is from 45 to 65% by volume, preferably from 50 to 60% by volume, in particular from 54 to 60% by volume.

The roller being perpendicular to the direction of travel of the strand, the groove of the roller is only visible in front or top view.

Figure 1:
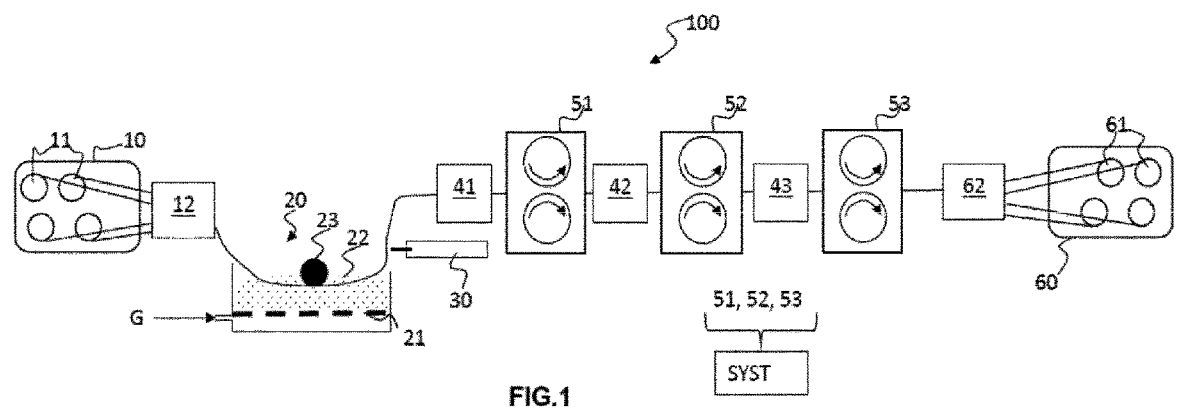
FIG. 1 shows a diagram of a unit for implementing the method for manufacturing a pre-impregnated fibrous material according to the invention.
Figure 2:
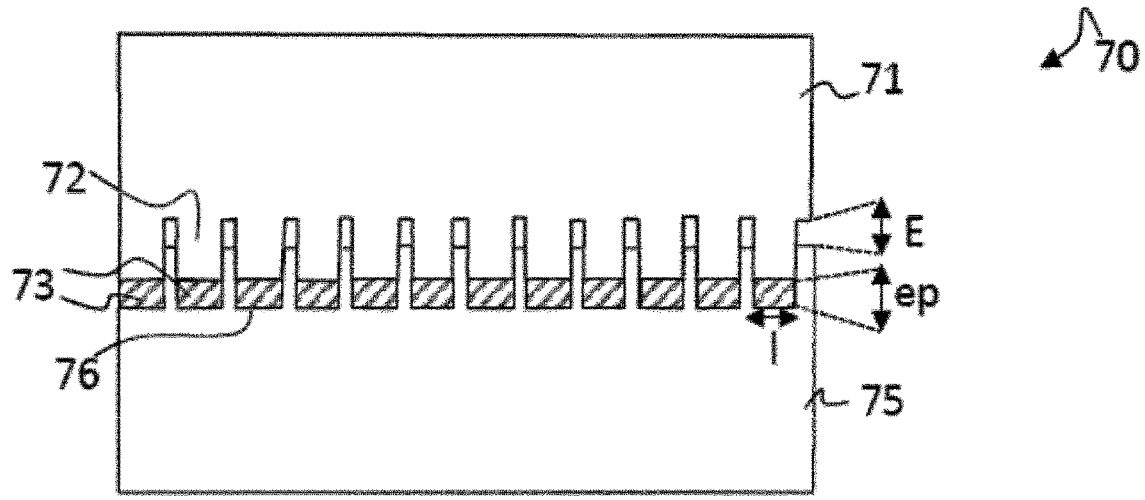
FIG. 2 shows a sectional diagram of two rollers constituting a calender as used in the unit of FIG. 1.
Figure 3:
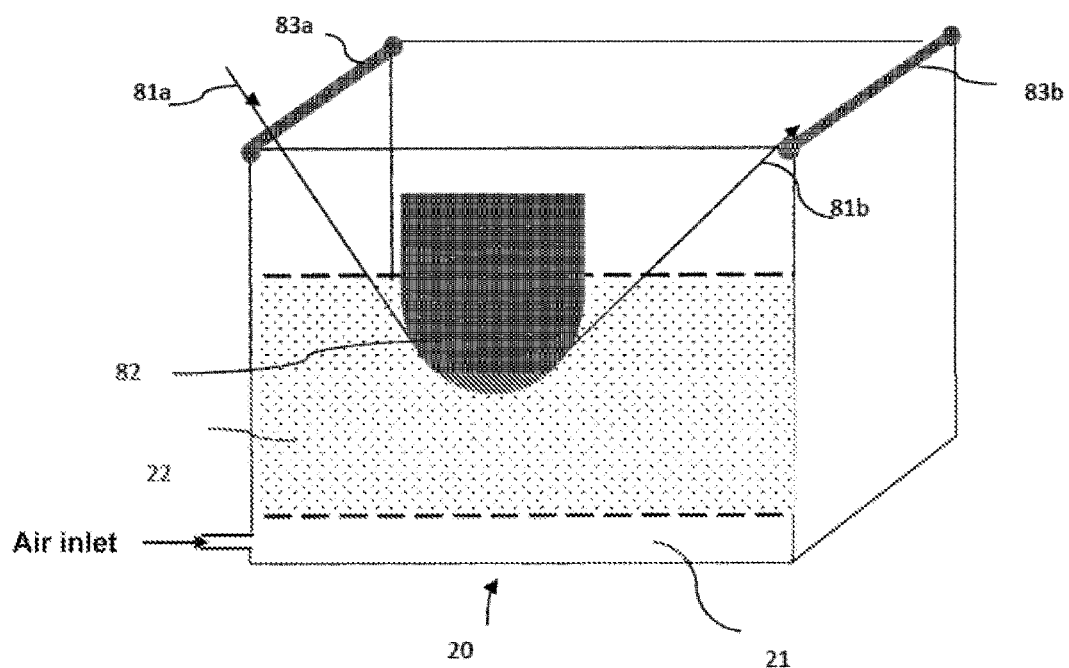
FIG. 3 describes a tank (20) comprising a fluidized bed (22) with a grooved roller component, the height (82) of which is adjustable. The edge of the inlet of the tank is equipped with a rotating roller 83a over which the strand 81a passes and the edge of the tank outlet is equipped with a rotating roller 83b over which the strand 81b passes.
Figure 4:
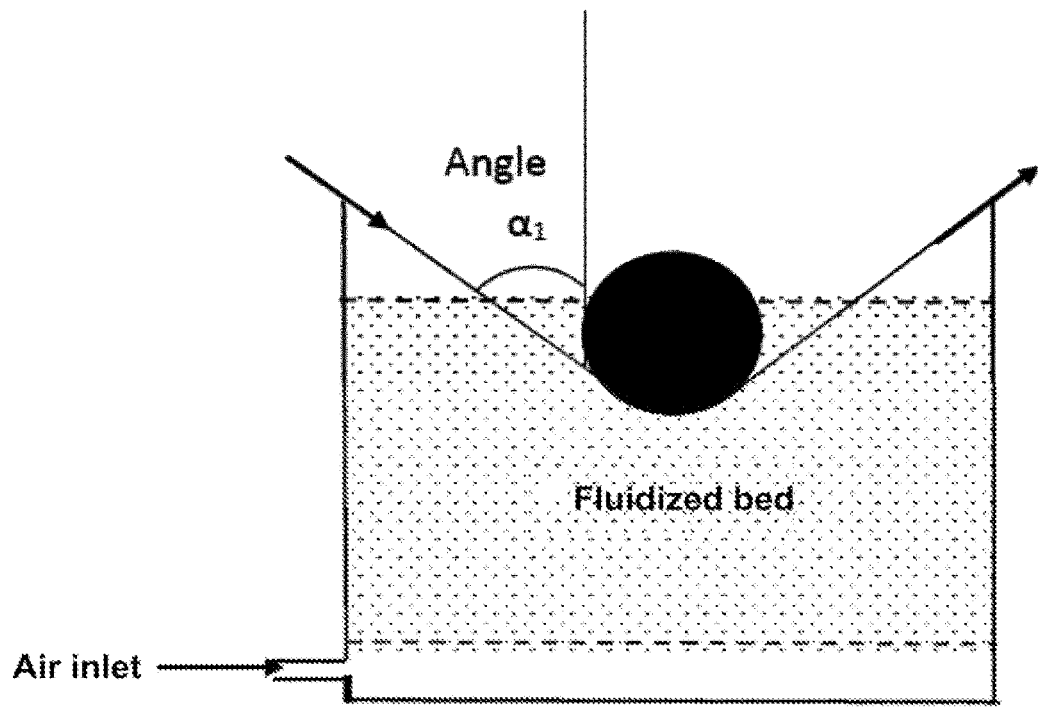
Figure 4:
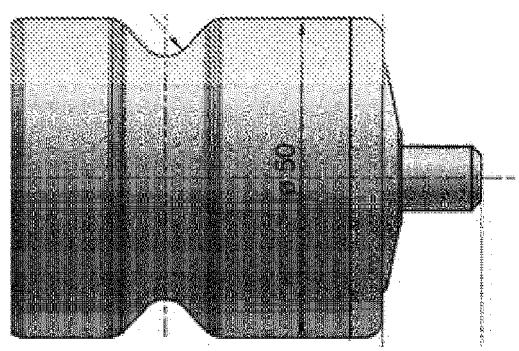

FIG. 4 shows describes an embodiment with a single grooved cylindrical roller, with a tank (20) comprising a fluidized bed (22) in which a single cylindrical grooved cylindrical roller (24) is present and showing the angle $\alpha_1$.

The arrows at the fibre indicate the direction of travel of the fiber.

The roller being perpendicular to the direction of travel of the strand, the groove of the roller is only visible in front or top view.

Figure 5:
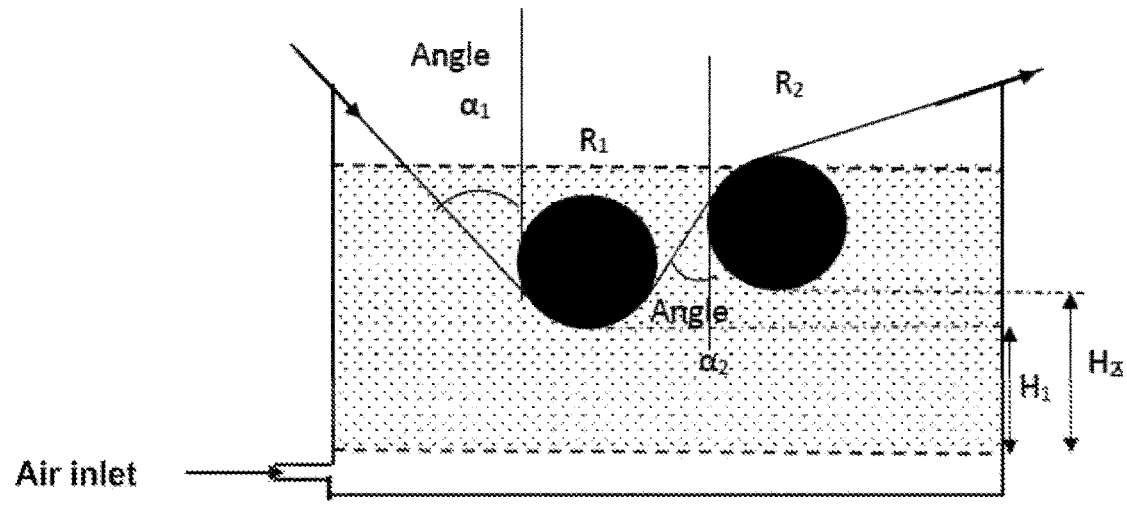

FIG. 5 shows, but is not limited to, an embodiment with two grooved cylindrical rollers $R_1$ and $R_2$, $R_1$ preceding $R_2$, with a tank (20) comprising a fluidized bed (22) in which the two cylindrical grooved cylindrical rollers are at different heights relative to the bottom of the tank ($R_2$ at a height $H_2$ above $R_1$ at a height $H_1$) are present and showing the angle $\alpha_1$ and $\alpha_2$.

The arrows at the fiber roving indicate the direction of travel of the fiber.

Figure 6:
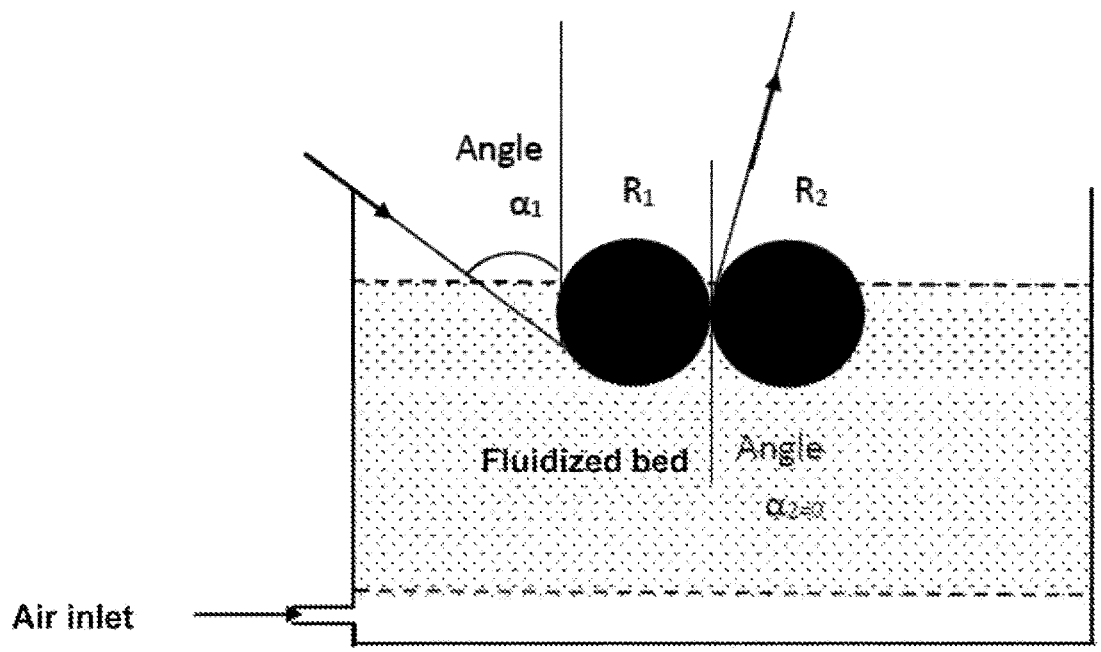

FIG. 6 shows an exemplary embodiment with a tank (20) comprising a fluidized bed (22) in which the two grooved cylindrical rollers $R_1$ and $R_2$ are cylindrical, at the same level relative to one another and side by side and showing the angle $\alpha_1$, and the angle $\alpha_2=0°$ and the strand passing between the 2 rollers.

Figure 7:
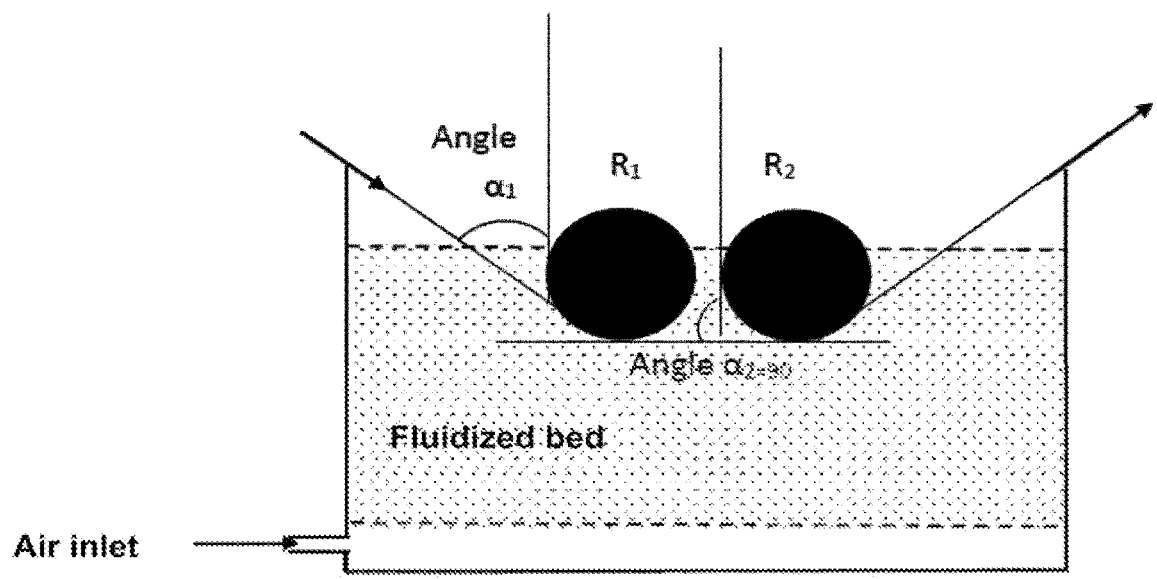

FIG. 7 shows an exemplary embodiment with the tank (20) comprising a fluidized bed (22) in which the two grooved cylindrical rollers $R_1$ and $R_2$ are cylindrical, at the same level relative to one another and side by side and showing the angle $\alpha_1$, and the angle $\alpha_2=90°$ and the strand passing below $R_2$.

Figure 8:
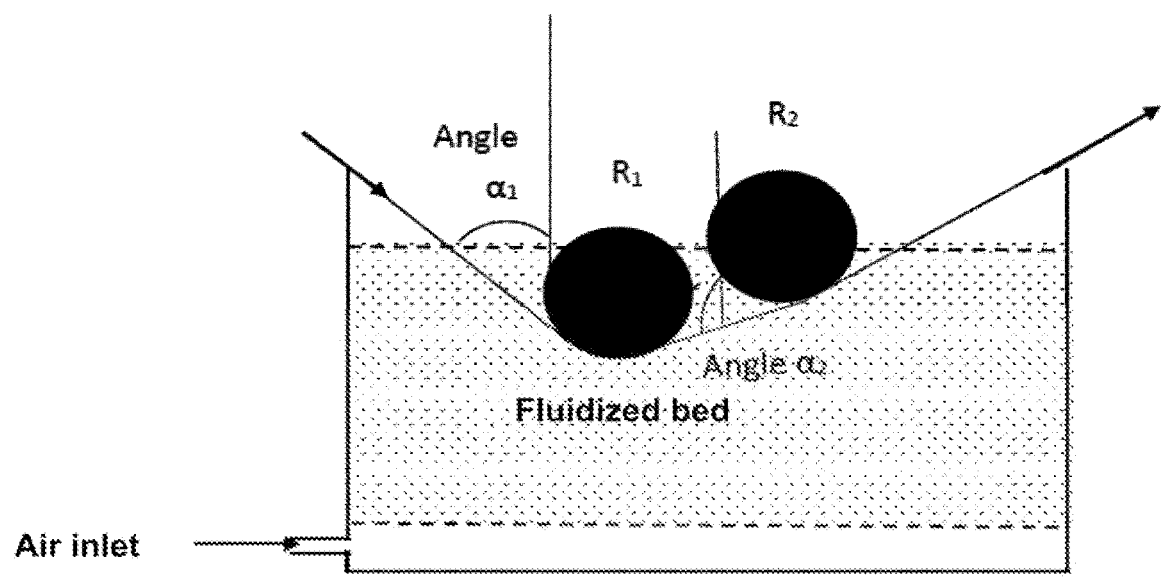

FIG. 8 shows an exemplary embodiment with the tank (20) comprising a fluidized bed (22) in which two grooved cylindrical rollers $R_1$ and $R_2$, $R_1$ preceding $R_2$, at different levels are present and showing the angle 1 and a2 and the strand passing below the roller $R_2$.

Figure 9:
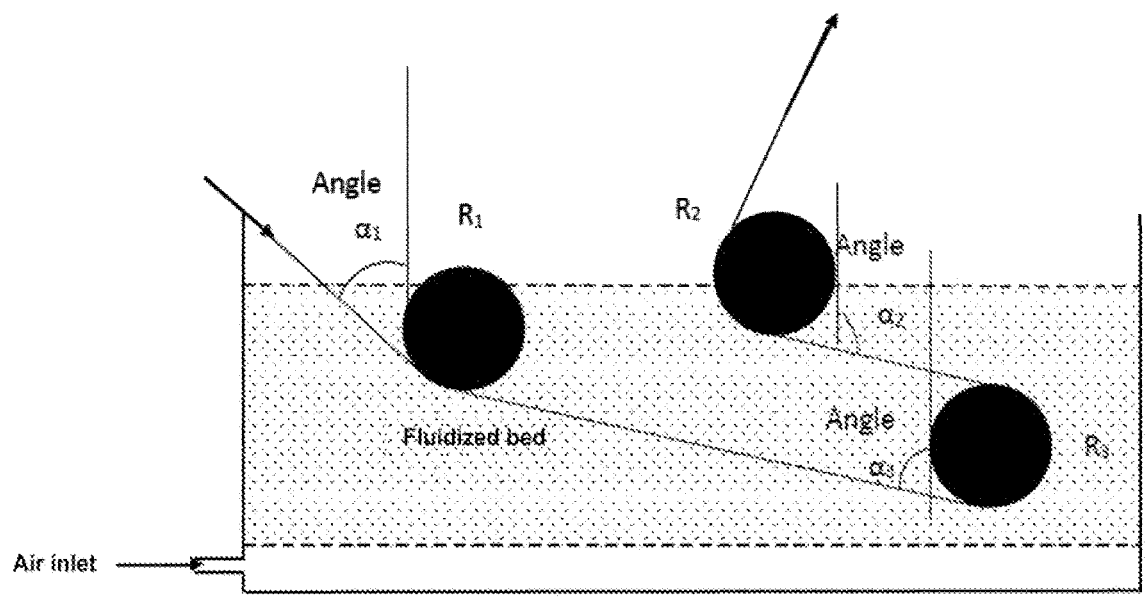

FIG. 9 shows an embodiment with a tank (20) comprising a fluidized bed (22) with two grooved cylindrical rollers $R_1$ and $R_2$, $R_1$ preceding $R_2$, and a grooved cylindrical roller $R_3$ and showing the angles $\alpha_1$, $\alpha_2$ and $\alpha_3$.

Figure 10:
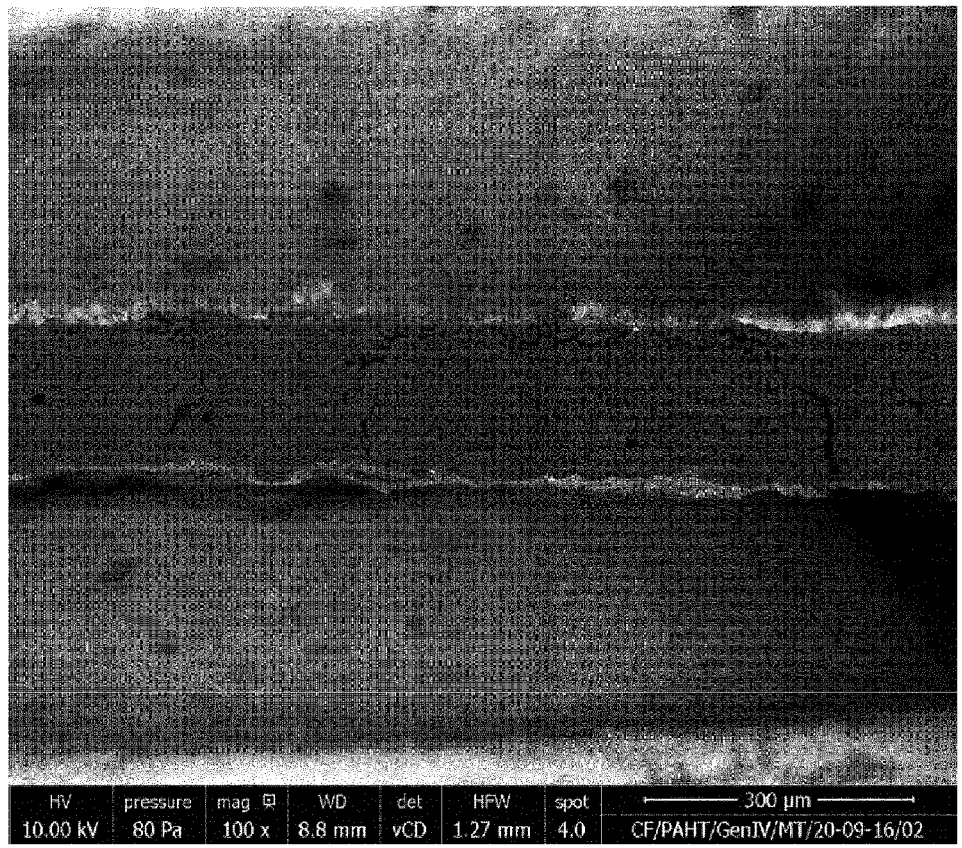

FIG. 10 shows a photograph taken by scanning electron microscopy of a sectional view of a ¼" carbon fiber band, obtained from a 12K carbon fiber strand pre-impregnated homogeneously with a PA MPMDT/10T polyamide powder (67/33 mol %) with D50=115 μm according to the method of WO2018115736 (as described in comparative example 1) with a non-grooved (smooth) roller and with a low tension at the inlet of the fluidized bed of 800 g.

The fibers are next impregnated to the core with said resin after melting of said powder present in said pre-impregnated strand, after heating and passage over a series of roller components, followed by calendering, in order to form said final band.

The image analysis done on a number of images statistically representative of said band yields a porosity level of 3%, excluding the edges of the band.

Figure 11:
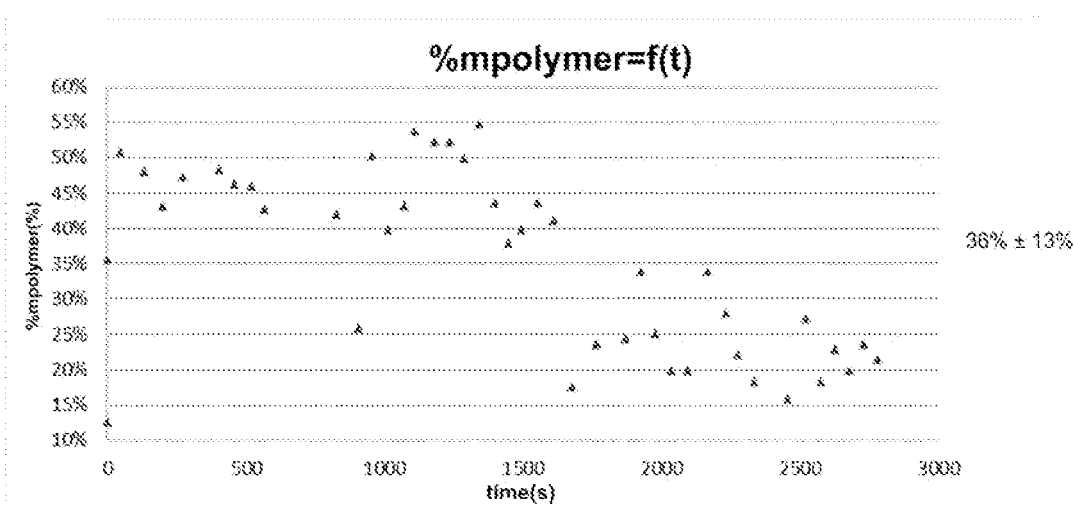

FIG. 11 shows the evolution of the weight percentage of MPMDT/10T impregnated in the strand as a function of time from comparative example 1.

Figure 12:
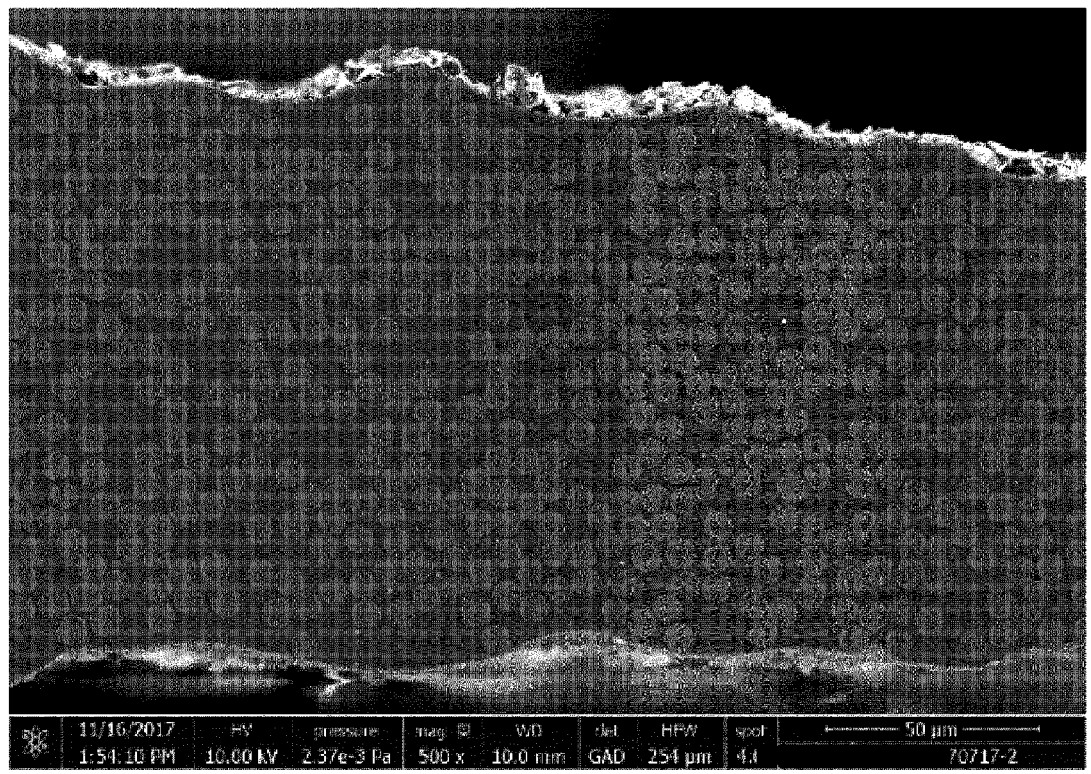

FIG. 12 shows a photograph taken by scanning electron microscopy of a sectional view of a ¼" carbon fiber band, obtained from a 12K carbon fiber strand pre-impregnated homogeneously with a PA MPMDT/10T polyamide powder (67/33 mol %) with D50=115 μm according to the method of the invention and as described in comparative example 2), that is to say, with a grooved roller and with a low tension at the inlet of the fluidized bed of 800 g. The fibers are next impregnated to the core with said resin after melting of said powder present in said pre-impregnated strand, after heating and passage over a series of roller components, followed by calendering, in order to form said final band.

after heating and calendering) with a grooved roller with a low tension at the inlet of the fluidized bed of 800 g of example 2.

Image analysis gives a porosity level of 1.5%, excluding the edges of the tape.

Figure 13:
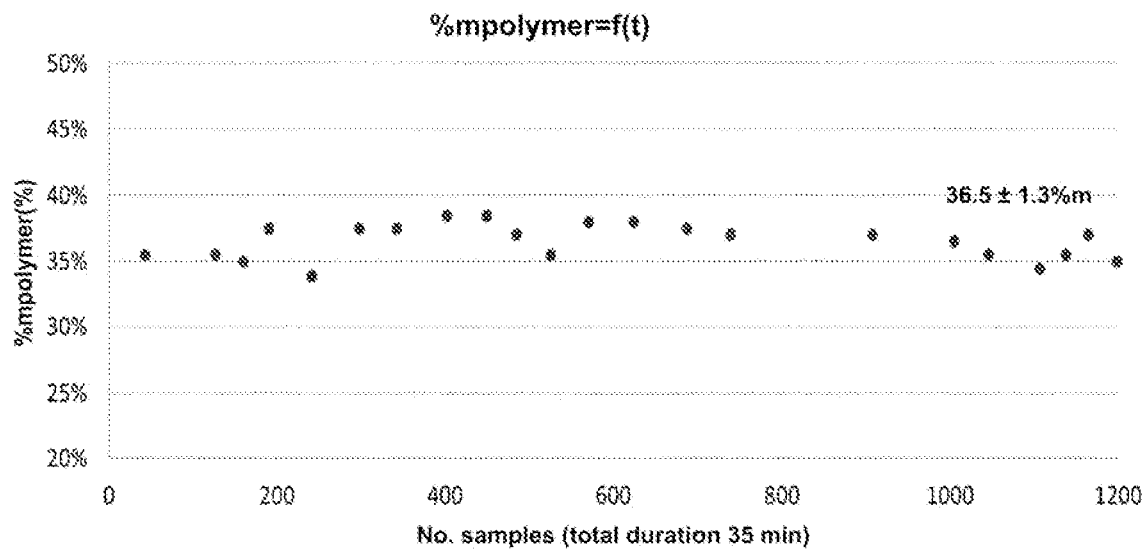

FIG. 13 shows the evolution of the weight percentage of MPMDT/10T impregnated in the strand as a function of time from example 2.

Figure 14:
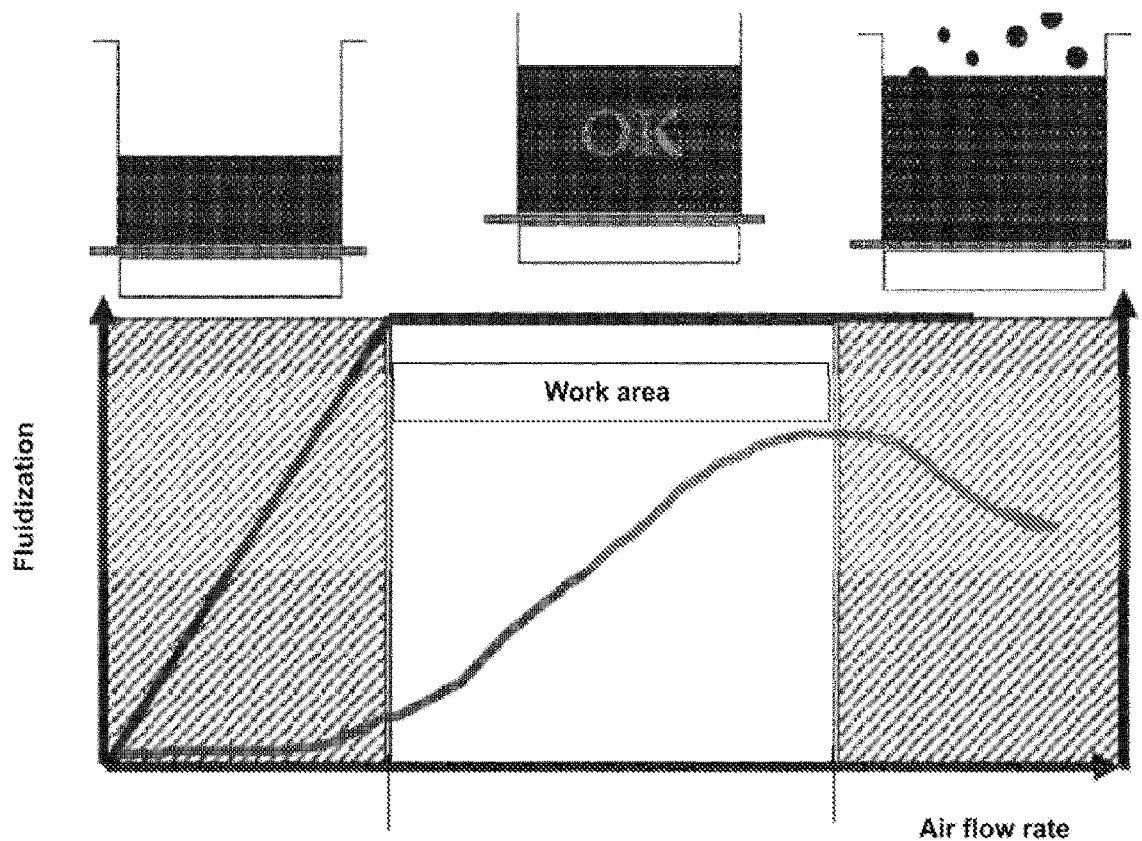

FIG. 14 shows the fluidization as a function of the air flow rate. The air flow rate applied to the fluidized bed must be between the minimum fluidization flow rate (Umf) and the minimum bubbling flow rate (Umf).

The following examples provide a non-limiting illustration of the scope of the invention.

Comparative Example 1: General Procedure for Pre-Impregnation of a Fibrous Material (Non-Sized Carbon Fiber) with a MPMDT/10T Powder (67/33 Mol %) in Fluidized Bed with a Single Smooth Cylindrical Roller and with a Low Tension of the Strand (800 g) at the Inlet of the Fluidized Bed The following procedure was carried out:
A smooth cylindrical roller in the tank (L=500 mm, I=500 mm, H=600 mm), diameter 25 mm.
Tension of the strand at the inlet of the fluidized bed: 800 g
Dwell time of 0.3 s in the powder
Angle α1 of 25°
Spreading about 100% (or a width multiplied by 2) for a 12K AS4 Hexcel carbon fiber strand
D50=115 μm, (D10=49 μm, D90=207 μm) for the MPMDT/10T powder.
edge of the tank equipped with a stationary roller.

The fibrous material (12K carbon fiber strand) has been homogeneously pre-impregnated with a MPMDT/10T polyamide powder of particle size defined hereinbefore according to this operating procedure and the band obtained from this pre-impregnated strand, after melting of the powder and passage over a series of roller components followed by calendering, is shown in FIG. 10 so as to obtain a ¼" band.

The obtained results show that the impregnated polymer level is not stable over time (see FIG. 11). The strand width in and at the outlet of the fluidized bed vary.

Example 2: General Procedure for Pre-Impregnation of a Fibrous Material (Non-Sized Carbon Fiber) with a Polyamide Powder in Fluidized Bed with a Single Grooved Cylindrical Roller with a Low Tension of the Strand at the Inlet of the Fluidized Bed (800 g)

The following procedure was carried out:
A grooved cylindrical roller in the tank (L=500 mm, I=500 mm, H=600 mm), diameter 25 mm at the groove bottom, 5 mm groove depth.
Tension of the strand at the inlet of the fluidized bed: 800 g
Dwell time of 0.3 s in the powder
Angle $α_1$ of 25°
Spreading about 100% (or a width multiplied by 2) for a non-sized 12K AS4 Hexcel carbon fiber strand
D50=115 μm, (D10=49 μm, D90=207 μm) for the MPMDT/10T powder (67/33 mol %).
edge of the tank equipped with a stationary roller.

The fibrous material (12K carbon fiber strand) has been homogeneously pre-impregnated with a MPMDT/10T polyamide powder of particle size defined hereinbefore according to this procedure and the band obtained from this pre-impregnated strand, after melting of the powder and passage over a series of roller components followed by calendering, is shown in FIG. 12 to obtain a ¼" tape.

It is observed that when a grooved roller is present in the powder, and by using a low tension for the fiber at the fluidized bed inlet, the impregnated polymer level is stable over time (cf. FIG. 13).

Furthermore, no created fuzz is observed before pre-impregnation due to the low tension applied to the fiber at the fluidized bed inlet, thus favoring the good material health of the tape.

This demonstrates the effectiveness of the method for pre-impregnation with a dry powder in a fluidized bed with a grooved cylindrical roller with a non-sized fiber and control of the dwell time and the tension in the powder as opposed to a smooth roller.

Example 3: Determination of the Porosity Level by Image Analysis

The porosity was determined by image analysis on a ½" carbon fiber strand impregnated with MPMDT/10T). It is 5%.

Example 4: Determination of the Porosity Level the Relative Deviation Between Theoretical Density and Experimental Density (General Method)

a) The required data are:
The density of the thermoplastic matrix
The density of the fibers
The grammage of the reinforcement:
linear mass (g/m) for example for a ¼ inch tape (coming from a single strand)
surface density (g/m$^2$) for example for a wider tape or a fabric
b) Measurements to be carried out:
The number of samples must be at least 30 in order for the result to be representative of the studied material:
The measurements to be carried out are:
The size of the samples taken:
Length (if linear mass is known).
Length and width (if surface density is known).

The experimental density of the samples taken:
Mass measurements in the air and in water.
The measurement of the fiber level is determined according to ISO 1172:1999 or by thermogravimetric analysis (TGA) as determined for example in the document B. Benzler, Applikationslabor, Mettler Toledo, Giesen, UserCom 1/2001.
The measurement of the carbon fiber level can be determined according to ISO 14127:2008.
Determination of the theoretical mass fiber level:
A) Determination of the Theoretical Mass Fiber Level:

$$\% \, Mf_{th} = \frac{m_l.L}{Me_{air}}$$

With
$m_l$ the linear mass of the tape,
L the length of the sample, and
$Me_{air}$ the mass of the sample measured in the air.
The variation of the mass fiber level is presumed to be directly related to a variation of the matrix level without taking into account the variation of the quantity of fibers in the reinforcement.
B) Determination of the Theoretical Density:

$$d_{th} = \frac{1}{\frac{1 - \% \, Mf_{th}}{d_m} + \frac{\% \, Mf_{th}}{d_f}}$$

With $d_m$ and $d_f$ the respective densities of the matrix and the fibres.
The theoretical density thus calculated is the accessible density if there is no porosity in the samples.
C) Evaluation of the Porosity:
The porosity then is the relative deviation between theoretical density and experimental density.

The invention claimed is:
1. A method of manufacturing a pre-impregnated fibrous material comprising a fibrous material made of continuous fibers and at least one thermoplastic polymer matrix, wherein said pre-impregnated fibrous matrix is produced as a single unidirectional band or a plurality of unidirectional parallel bands and wherein said method comprises a step of pre-impregnating said fibrous material while it is in the form of a strand or several parallel strands with said at least one thermoplastic polymer matrix in powdered form, said pre-impregnation step being done by a dry process in a tank comprising a fluidized bed comprising at least one grooved roller component,
   said strand(s) being in contact with part or all of the surface of said at least one grooved roller component and said strand(s) comprising up to 0.1% by weight of sizing,
   and a control of an amount of said at least one thermoplastic polymer matrix in said fibrous material being done by controlling the dwell time of said fibrous material in the powder and by constant control of the tension of said strand(s) when it or they penetrate the fluidized bed,
   wherein the minimum width of said strand(s) is greater than the width of the groove of said grooved roller component.
2. The method according to claim 1, wherein said strand(s) is (are) non-sized.
3. The method according to claim 1, wherein the tension of said strand(s) when it or they penetrate the fluidized bed is up to 1000 g.
4. The method according to claim 3, the tension of said strand(s) when it or they penetrate the fluidized bed is from 100 to 1000 g.
5. The method according to claim 1, wherein said pre-impregnation step is carried out with simultaneous spreading of said strand or of said strands between an inlet and an outlet of said fluidized bed.
6. The method according to claim 1, wherein the volume-average diameter D50 of the particles of thermoplastic polymer powder is from 30 to 300 µm.
7. The method according to claim 1, wherein the fiber level in an impregnated fibrous material obtained from the pre-impregnated fibrous material is from 45 to 65% by volume.
8. The method according to claim 1, wherein the dwell time in the powder is from 0.01 s to 10 s.
9. The method according to claim 1, wherein said grooved roller component is a grooved cylindrical roller and a spreading percentage of said strand or of said strands between the inlet and the outlet of said tank is from 1% to 400%.
10. The method according to claim 9, wherein a single grooved cylindrical roller is present in the fluidized bed and said pre-impregnation is carried out at an angle $\alpha_1$ formed by said strand or said strands between the inlet of said grooved cylindrical roller and a vertical tangent to said grooved cylindrical roller.
11. The method according to claim 10, the angle $\alpha_1$ is from 0° to 89.
12. The method according to claim 9, wherein two grooved cylindrical rollers $R_1$ and $R_2$ are present in said fluidized bed and said pre-impregnation is carried out at an angle $\alpha_1$ formed by said strand or said strands between the inlet of said grooved cylindrical roller $R_1$ and a vertical tangent to said grooved cylindrical roller $R_1$ and/or at an the angle $\alpha_2$ formed by said strand or said strands between the inlet of said grooved cylindrical roller $R_2$ and a vertical tangent to said grooved cylindrical roller $R_2$, said grooved cylindrical roller $R_1$ (in the direction in which the process proceeds) preceding said grooved cylindrical roller $R_2$ and said strand or said strands being able to pass above or below the roller $R_2$.
13. The method according to claim 12, wherein the distance between the two grooved cylindrical rollers $R_1$ and $R_2$ is from 0.15 mm to the length equivalent to the maximum dimension of the tank, and wherein the height difference between the two grooved cylindrical rollers $R_1$ and $R_2$ is from 0 to the height corresponding to the maximum height of the tank subtracted from the diameters of the two grooved cylindrical rollers.
14. The method according to claim 1, wherein a single thermoplastic polymer matrix is used and the thermoplastic polymer powder is fluidizable.
15. The method according to claim 1, wherein the method further comprises at least one step of heating the thermoplastic matrix allowing said thermoplastic polymer to be melted or kept in melt condition after pre-impregnation,
   the at least one heating step being carried out by means of at least one heat-conducting or non-heat-conducting roller component (E) and at least one heating system, the heating system not including a heating calender,
   said strand or strands being in contact with part or all of the surface of said at least one roller component (E) and partially or totally running over the surface of said at least one roller component (E), wherein a height difference between the heating system and the at least one roller component is between 1 cm and 100 cm.

16. The method according to claim 15, comprising:
producing calibrated bands suitable for the manufacture of three-dimensional composite parts by the automated laying of said bands by means of a robot.

17. The method according to claim 1, wherein the method additionally comprises a step for shaping said strand or said parallel strands of said pre-impregnated fibrous material, by calendering using at least one heating calender, in the form of a single unidirectional band or a plurality of parallel unidirectional bands or sheets with, in the latter case, said heating calender comprising a plurality of calendering grooves, in accordance with the number of said bands and with a pressure and/or separation between the rollers of said calender regulated by a closed-loop control system.

18. The method according to claim 17, wherein the calendering step is carried out using a plurality of heating calenders, mounted in parallel and/or in series relative to the direction of travel of the fiber strands.

19. The method according to claim 17, wherein said heating calender(s) comprise(s) an integrated induction or microwave heating system, coupled with the presence of carbon-based fillers in said thermoplastic polymer or mixture of thermoplastic polymers.

20. The method according to claim 17, wherein said heating calender(s) is (are) coupled to an additional heating device, located before and/or after said (each) calender.

21. The method according to claim 1, wherein said pre-impregnation step(s) is (are) supplemented by a step of covering said single strand or said plurality of parallel strands after pre-impregnation by the powder, said covering step being carried out before said calendering step, with a molten thermoplastic polymer, which may be identical to or different from said polymer in powder form in fluidized bed.

22. The method according to claim 1, wherein said thermoplastic polymer further comprises carbonaceous fillers.

23. The method according to claim 1, wherein said thermoplastic polymer further comprises liquid crystal polymers or cyclized poly(butylene terephthalate), or blends containing these as additives.

24. The method according to claim 1, wherein said at least one thermoplastic polymer is selected from: polyaryl ether ketones (PAEK); polyaryl ether ketone ketones (PAEKK); aromatic polyether imides (PEI); polyaryl sulfones; polyarylsulfides; polyamides (PA); PEBAs, polyacrylates; polyolefins; and mixtures thereof.

25. The method according to claim 24, wherein said at least one thermoplastic polymer is a polymer whose glass transition temperature is such that $Tg \geq 80°$ C., or a semi-crystalline polymer whose melting point $Tm \geq 150°$ C.

26. The method according to claim 1, wherein said fibrous material comprises continuous fibers, the continuous fibers including:
carbon; or
glass; or
silicon carbide; or
basalt; or
silica; or
natural fibers; or
amorphous thermoplastic fibers with a glass transition temperature Tg higher than the Tg of a polymer or a polymer mixture when the latter is amorphous or higher than the Tm of said polymer or said polymer mixture when the latter is semi-crystalline; or
semi-crystalline thermoplastic fibers with a melting temperature Tm higher than the Tg of said polymer or said polymer mixture when the latter is amorphous or higher than the Tm of said polymer or said polymer mixture when the latter is semi-crystalline; or
a mixture of two or more of said fibers.

* * * * *